US011334562B2

(12) United States Patent
Lee et al.

(10) Patent No.: US 11,334,562 B2
(45) Date of Patent: May 17, 2022

(54) BLOCKCHAIN BASED DATA MANAGEMENT SYSTEM AND METHOD THEREOF

(71) Applicant: SAMSUNG SDS CO., LTD., Seoul (KR)

(72) Inventors: Kyu Sang Lee, Seoul (KR); Chang Suk Yoon, Seoul (KR); Young Yoo Heo, Seoul (KR); Han Saem Seo, Seoul (KR); Kyung Jin Kim, Seoul (KR); Ki Woon Sung, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 192 days.

(21) Appl. No.: 16/666,788

(22) Filed: Oct. 29, 2019

(65) Prior Publication Data
US 2021/0103581 A1      Apr. 8, 2021

(30) Foreign Application Priority Data
Oct. 4, 2019   (KR) .................. 10-2019-0122937

(51) Int. Cl.
*G06F 16/00*      (2019.01)
*G06F 16/23*      (2019.01)

(52) U.S. Cl.
CPC ...... *G06F 16/2379* (2019.01); *G06F 16/2365* (2019.01)

(58) Field of Classification Search
CPC ............ G06F 16/2393; G06F 16/2386; G06F 16/1805; G06F 16/2379; G06F 16/2365; G06F 16/2372; G06F 16/21; G06F 21/64; G06Q 20/382; H04L 63/0815; H04L 63/0876; H04L 2209/38

See application file for complete search history.

(56) References Cited

U.S. PATENT DOCUMENTS

| | | | | |
|---|---|---|---|---|
| 9,135,123 | B1 * | 9/2015 | Armangau | G06F 11/1471 |
| 10,313,360 | B2 * | 6/2019 | Wilson | G06F 16/24 |
| 11,037,227 | B1 * | 6/2021 | Padilha | G06Q 30/0645 |
| 11,086,713 | B1 * | 8/2021 | Sapuntzakis | G06F 3/0673 |
| 2016/0212146 | A1 * | 7/2016 | Wilson | H04L 9/3226 |
| 2018/0294956 | A1 * | 10/2018 | O'Brien | G06F 11/1464 |
| 2018/0332011 | A1 * | 11/2018 | Gray | G06Q 20/382 |
| 2019/0013933 | A1 * | 1/2019 | Mercuri | G06F 16/904 |
| 2019/0073666 | A1 * | 3/2019 | Ortiz | G06F 16/27 |
| 2019/0081793 | A1 * | 3/2019 | Martino | G06Q 20/065 |
| 2019/0087892 | A1 * | 3/2019 | Pinski | H04L 9/3239 |
| 2019/0279206 | A1 * | 9/2019 | Song | G06F 16/1834 |
| 2019/0303031 | A1 * | 10/2019 | Sabourin | G06F 16/00 |
| 2019/0318338 | A1 * | 10/2019 | Verma | H04L 9/0637 |

(Continued)

FOREIGN PATENT DOCUMENTS

KR   10-2019-0076197 A    7/2019

*Primary Examiner* — Noosha Arjomandi
(74) *Attorney, Agent, or Firm* — The PL Law Group, PLLC

(57) ABSTRACT

A data management system according to an embodiment of this invention includes a blockchain node configured to store on-chain data on blockchain and a service server, upon receiving a service request associated with the original data from a client, i) accessing off-chain data stored in a storage node or recording off-chain data in the storage node according to the service request, and ii) sending a transaction proposal to the blockchain node for a record associated with the service request to be stored in the blockchain.

18 Claims, 16 Drawing Sheets

(56) References Cited

U.S. PATENT DOCUMENTS

| | | | | |
|---|---|---|---|---|
| 2019/0342084 A1* | 11/2019 | Mehedy | ............... | H04L 9/0643 |
| 2019/0385229 A1* | 12/2019 | Leonard | ............... | H04L 9/0637 |
| 2020/0007313 A1* | 1/2020 | Vouk | ..................... | H04L 9/0637 |
| 2020/0042958 A1* | 2/2020 | Soundararajan | ....... | G06Q 20/06 |
| 2020/0045020 A1* | 2/2020 | Soundararajan | ........ | H04L 9/006 |
| 2020/0092083 A1* | 3/2020 | Keskar | ................ | G06K 9/6262 |
| 2020/0242595 A1* | 7/2020 | Harrison | ................ | H04L 63/12 |
| 2020/0267163 A1* | 8/2020 | Wilson | ................. | H04L 9/3271 |
| 2020/0372003 A1* | 11/2020 | Boelderl-Ermel | ............................ G06F 16/1865 | |
| 2021/0019740 A1* | 1/2021 | Bhamidipati | ........ | G06Q 20/065 |
| 2021/0092127 A1* | 3/2021 | Li | ............................. | G06F 8/70 |
| 2021/0092185 A1* | 3/2021 | DeRosa-Grund | ..... | H04L 9/0825 |
| 2021/0109776 A1* | 4/2021 | Behl | ....................... | G06F 9/451 |
| 2021/0194698 A1* | 6/2021 | Yu | ........................ | H04L 9/3239 |

* cited by examiner

FIG. 4
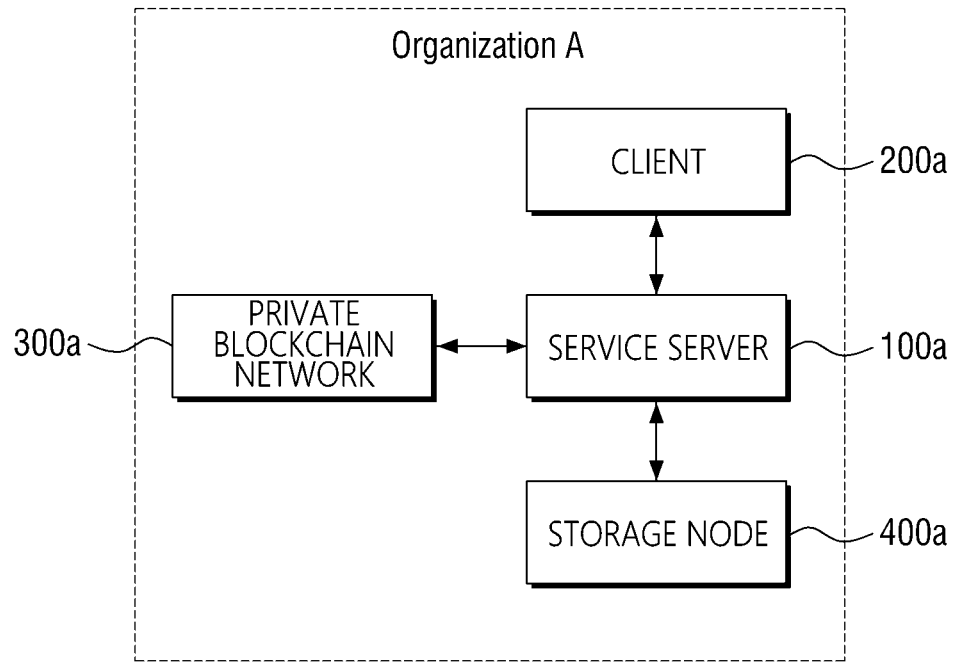
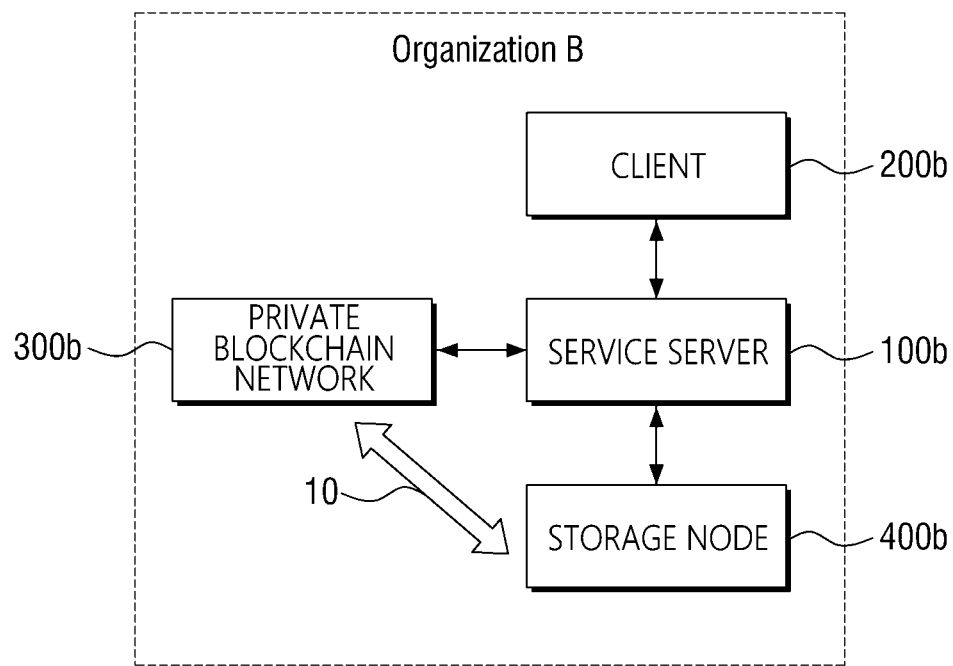

BLOCKCHAIN BASED DATA MANAGEMENT SYSTEM AND METHOD THEREOF

CROSS REFERENCE TO RELATED APPLICATIONS AND CLAIM OF PRIORITY

This application claims priority to and the benefit of Korean Patent Application No. 10-2019-0122937, filed on Oct. 4, 2019, the disclosure of which is incorporated herein by reference in its entirety.

FIELD

The present invention relates to a system and method for reliably managing data not stored on the blockchain (off-chain data) using blockchain technology.

DESCRIPTION OF THE RELATED ART

Blockchain means data management technology, in which continuously increasing data is recorded into a specific unit of block and each blockchain node constituting a peer-to-peer network manages the block as a chain-type data structure, or data structure itself. Blockchain technology can guarantee the integrity and security of transactions through a consensus process, in which all blockchain nodes belonging to the network record and verify transactions.

Data recorded in the blockchain is referred to as on-chain data, and data managed based on blockchain technology, but not recorded in the blockchain is referred to as off-chain data. Since each block constituting the blockchain is limited in the size and the blockchain itself is an expensive resource, all data to be managed reliably cannot be recorded on the blockchain. Such off-chain data is stored outside the blockchain and therefore vulnerable to unauthorized manipulations and the like. Accordingly, there is a need to provide a blockchain-based data management system that can reliably manage off-chain data.

Meanwhile, in a consortium blockchain constituted by two or more organizations, not only on-chain data but also off-chain data are shared among all the organizations constituting the consortium blockchain. As a result, if a consortium blockchain is constituted, it is impossible to differentiate the sharing permission for off-chain data by organization. Since it is a big problem for companies to share sensitive data that should not be shared with other companies, it is required to provide a system that can control the sharing of off-chain data between organizations in the consortium blockchain.

SUMMARY

Some embodiments of the present invention provide a data management system for recording access or change provenance for management target data on the blockchain without omissions, and a data management method thereof.

Some embodiments of the present invention provide a data management system, in which it is impossible to obtain the original of management target data by unauthorized access to the management target data, and a data management method thereof.

Some embodiments of the present invention provide a data management system, which minimizes the cost to test for new registration or update of data when it is inappropriate to register or update for the data, and a data management method thereof.

Some embodiments of the present invention provide a data management system capable of selectively sharing management target data using a consortium blockchain even when a plurality of organizations constitute the consortium blockchain, and a data management method thereof.

Some embodiments of the present invention provide a data management system, in which when data uploaded to a storage node dedicated to the first organization is set to be shared with the second organization, such provenance is automatically recorded in the blockchain, and the data is automatically shared with a storage node of the second organization, and a data management method thereof.

Some embodiments of the present invention provide a data management system, in which when data uploaded to a storage node dedicated to the first organization is set to be shared with the second organization, in the process that the data is shared with the storage node dedicated to the second organization, the storage node dedicated to the first organization and the storage node dedicated to the second organization send and receive data in parallel in a peer-to-peer (p2p) manner, respectively, thereby accelerating the data sharing speed, and a data management method thereof.

Embodiments of the present invention are not limited to the above-mentioned embodiments, and other embodiments not mentioned will be clearly understood by those skilled in the art from the following description.

According to an embodiment, a data management system is provided. The data management system comprises a blockchain node configured to store on-chain data on blockchain a service server, upon receiving a service request associated with the original data from a client, i) accessing off-chain data stored in a storage node or recording off-chain data in the storage node according to the service request, and ii) sending a transaction proposal to the blockchain node for a record associated with the service request to be stored in the blockchain. The storage node may configured to store off-chain data to be restored to original data by the service server.

The service server may not access or record the off-chain data if the record associated with the service request is not stored in the blockchain.

The first request may be a read request or a download request of the original data, the service server, upon receiving the first request, may restore the original data using both the off-chain data stored in the storage node and data stored in the blockchain.

The blockchain node and the service server may be computing devices connected to an internal network of a first organization, the blockchain may be a private blockchain of the first organization, the storage node may be a device configuring a dedicated storage system of the first organization, the service server may be a device serving as both a service server of the block chain and a service server of the dedicated storage system.

The blockchain node and the service server may be computing devices connected to an internal network of a first organization, the blockchain, within a blockchain network constituted along with a blockchain node of at least one other organization besides the first organization, may be operated to match a channel constituted with a blockchain node of the first organization, and may not be allowed to be accessed by a blockchain node of other organization besides the first organization, the storage node may be a device configuring a dedicated storage system of the first organization, the service server may be a device serving as both a service server of the block chain and a service server of the dedicated storage system.

The service server may perform a plurality of times of sending the transaction proposal to the blockchain node if the service request is a registration request of new data. The service server may receive reference data associated with the new data from the client, generate transaction contents using the reference data, and send a transaction proposal including the transaction contents. A data size of the reference data necessary to generate transaction contents included in a previous transaction proposal may be less than a data size of the reference data necessary to generate transaction contents included in a next transaction proposal.

The service server, when the service request is a registration request of new data or an update request of existing data, may send off-chain data to be recorded/updated in the storage node to the storage node only if it is possible to determine an agreement success by using a response to the transaction proposal. The service server may generate the off-chain data using the new data received from the client or updated existing data, and send the generated off-chain data to the storage node.

The service server, when the service request is a registration request of new data or an update request of existing data, may record new off-chain data in the storage node according to the service request and sends a transaction proposal to the blockchain node for a record associated with the service request to be stored in the blockchain. The blockchain node may refer to the new off-chain data recorded in the storage node to generate a response to the transaction proposal. The service server may automatically delete the new off-chain data recorded in the storage node according to the service request if it is impossible to determine an agreement success by using a response to the transaction proposal received from the blockchain node.

The service server, when the service request is a registration request of new data or an update request of existing data, may automatically determine a processing type of the service request as one of pre-agreement or pre-upload, the service server, if the processing type of the service request is determined as pre-agreement, may send a transaction proposal to the blockchain node for a record associated with the service request to be stored in the blockchain and send the off-chain data to the storage node only if it is possible to determine an agreement success by using a response to the transaction proposal, the service server, if the processing type of the service request is determined as pre-upload, may record new off-chain data in the storage node according to the service request and send a transaction proposal to the blockchain node for a record associated with the service request to be stored in the blockchain.

According to another embodiment, the data management system may comprise a first blockchain node of a first institution configured to store a blockchain recording on-chain data, a second blockchain node of a second institution configured to store the blockchain, a first storage node dedicated to a first organization for storing off-chain data of the first institution for the blockchain and a second storage node dedicated to a second organization for storing off-chain data of the second institution for the blockchain. A blockchain node of the first institution and a blockchain node of the second institution may be connected by the same channel, the first blockchain node may query the first storage node, and the second blockchain node may query the second storage node.

The first storage node may send only some data of off-chain data stored in the first storage node, which is set to be shared with the second institution, to the second storage node.

In an embodiment, the data management system may further comprise a first service server of the first institution, upon receiving a service request associated with the original data from a client of the first institution, i) accessing off-chain data stored in the first storage node or recording off-chain data in the first storage node according to the service request, and ii) sending a transaction proposal to at least some of the first blockchain node and the second blockchain node for a record associated with the service request to be stored in the blockchain and a second service server of the second institution, upon receiving a service request associated with the original data from a client of the second institution, i) accessing off-chain data stored in the second storage node or recording off-chain data in the second storage node according to the service request, and ii) sending a transaction proposal to at least some of the first blockchain node and the second blockchain node for a record associated with the service request to be stored in the blockchain. The first storage node may send only some data of off-chain data stored in the first storage node, which is set to be shared with the second institution, to the second storage node via the first service server and the second service server.

In another embodiment, the data management system may further comprise a first-first storage node dedicated to the first institution located in a cloud storage system along with the first storage node for storing off-chain data of the first institution for the blockchain and a second-first storage node dedicated to the second institution located in a cloud storage system along with the first storage node for storing off-chain data of the second institution for the blockchain. The first storage node may send only some data of off-chain data stored in the first storage node, which is set to be shared with the second institution, directly to the second storage node, the first-first storage node may also send only some data of off-chain data stored in the first-first storage node, which is set to be shared with the second institution, directly to the second-first storage node.

If a type of the sharing is fork, forked original data may be recorded in the blockchain as independent data of the second institution.

In still another embodiment, the data management system may further comprise a first service server of the first institution, upon receiving a service request associated with the original data from a client of the first institution, i) accessing off-chain data stored in the first storage node or recording off-chain data in the first storage node according to the service request, and ii) sending a transaction proposal to at least some of the first blockchain node and the second blockchain node for a record associated with the service request to be stored in the blockchain. The first service server, when the service request is a registration request of new data, may send a transaction proposal, in which registration of the new data is transaction contents, to the second blockchain node only if the second institution belongs to a sharing institution of the new data.

In still another embodiment, the data management system may further comprise a first service server of the first institution, upon receiving a service request associated with the original data from a client of the first institution, i) accessing off-chain data stored in the first storage node or recording off-chain data in the first storage node according to the service request, and ii) sending a transaction proposal to the first blockchain node and the second blockchain node for a record associated with the service request to be stored in the blockchain. The first blockchain node and the second blockchain node may execute the same smart contract, but the smart contract includes logic to return a consent response without a condition to every transaction proposal associated with data that is not shared with an institution, to which the blockchain node executing smart contract belongs.

The first storage node, when at least some off-chain data of original data that is being shared after being shared from the second institution to the first institution according to a transaction of the blockchain are deleted, may receive deleted off-chain data from the second storage node.

BRIEF DESCRIPTION OF THE DRAWINGS

FIG. 4 is a diagram for describing a case, in which the data management system described with reference to FIGS. 1 to 3 is used in a private blockchain environment.

DETAILED DESCRIPTION

Figure 1:
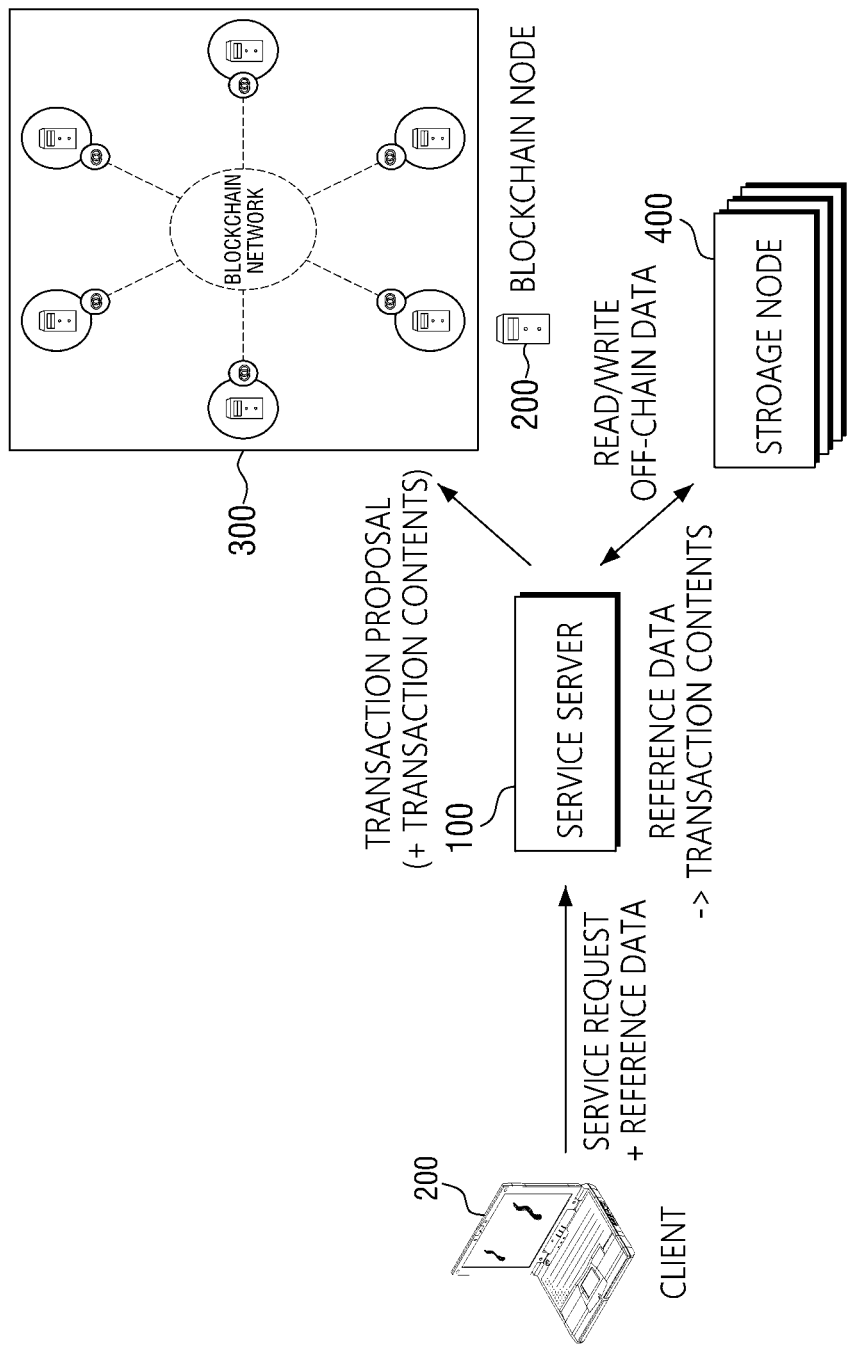
FIGS. 1 to 2 are configuration diagrams of a data management system according to an embodiment of the present invention.

The present invention will now be described more fully hereinafter with reference to the accompanying drawings. Advantages and features of the present invention and methods for achieving them will be apparent with reference to the embodiments described below in detail with the accompanying drawings. This invention may, however, be embodied in different forms and should not be construed as limited to the embodiments set forth herein. Rather, these embodiments are provided so that this disclosure will be thorough and complete, and will fully convey the scope of the invention to those skilled in the art, and the technical spirit of the present invention is defined only by the scope of the claims.

In adding reference numerals to the elements of each drawing, it should be noted that the same reference numerals are assigned to the same elements as much as possible even though they are shown in different drawings. In addition, in describing the present invention, when it is determined that the detailed description of the related well-known element or function may obscure the gist of the present invention, the detailed description thereof will be omitted.

Unless defined otherwise, all technical and scientific terms used herein have the same meaning as commonly understood by one of ordinary skill in the art to which this invention belongs. Further, unless defined otherwise, all terms defined in generally used dictionaries may not be overly interpreted. Terms used herein is for the purpose of describing embodiments only and is not intended to be limiting of the invention. In this specification, the singular also includes the plural unless specifically stated otherwise in the phrase.

In addition, in describing elements of this invention, terms, such as 1st, 2nd, A, B, (a), (b), can be used. These terms are only for distinguishing the elements from other elements, and the substance, sequence or order of the elements are not limited by the terms. If an element is described as being "coupled" or "connected" to another element, that element may be directly connected to or connected to that other component, but another element may be "coupled" or "connected" between each component.

Hereinafter, some embodiments of the present invention will be described in detail with reference to the accompanying drawings.

FIG. 1 is an exemplary configuration diagram illustrating a blockchain based data management system according to an embodiment of the present invention.

As shown in FIG. 1, the blockchain-based data management system (hereinafter, abbreviated as 'data management system') according to the present embodiment may include one or more block chain nodes 200 constituting a service server 100 and a blockchain network 300. Hereinafter, reference numeral "200" is used to refer to an arbitrary blockchain node, and in case of distinguishing and referring to a blockchain node, the alphabets (e.g., a, b, c) are included in reference numeral "200."

The blockchain node 200 constitutes a blockchain network 300 having a peer-to-peer (P2P) structure and operates according to a blockchain protocol. Each blockchain node 200 may manage a ledger. In some embodiments, the ledger may include a blockchain, in which transaction data is recorded, and a state database (DB), in which a state record (e.g., a state value corresponding to a state key) is stored. Further, the transaction data may include a state record associated with the corresponding transaction. The blockchain node 200 can share various smart contract and transaction data through the blockchain, and can guarantee the integrity and security of the transaction through a consensus process.

In some embodiments, the data management system may further include one or more storage nodes 400 for storing off-chain data, wherein the storage node 400 is a storage device included in a cloud storage system, which is serviced by an using institution of the management system and other institutions, and may be merely a virtual storage resource allocated to the using institution of the management system, in which case the storage node 400 is not an essential component of the data management system, but it is sufficient to be connected to the service server 100 to send and receive the read/write request of off-chain data with the service server 100.

The off-chain data is external data referenced by the blockchain node 200 constituting the blockchain network 300 in performing an operation, such as a smart contract stored in the blockchain, and the data is restored to the original data by the service server 100.

Further, the data managed by the data management system according to the present embodiment is the original data, not the off-chain data. That is, the data management system according to the present embodiment does not store the original data to be managed in the storage node 400 as it is such that the original data stored in the storage node is referred by each blockchain node 200 as the off-chain data, but stores the off-chain data, in which the original data is converted or fragmented, in the storage node 400 such that each blockchain node 200 refers to the off-chain data in performing an operation.

In the operation of each blockchain node 200, when referring to the off-chain data, identification information of the original data to be considered, a verification value (e.g., a hash value) of the entire original data, address information of each off-chain data constituting the original data, a verification value (e.g., a hash value) of the off-chain data, and the like may be stored in the blockchain as on-chain data.

The service server 100 receives a service request from the client 200. The service request may mean that one or more methods executed by the service server 100 are called. In some embodiments, a microservice type application executed on the client 200 may send the service request. The service request results in the addition of a transaction to the blockchain and the access of off-chain data stored in the storage node 400 or the storage of new off-chain data for the storage node 400.

Although the service request results in the addition of a transaction to the blockchain, the client 200 should not send the service request directly to the blockchain node 200, hut to the service server 100. In an embodiment, the blockchain node 200 may store identification information of the service server 100 and ignore a request received from a computing device other than the service server 100.

Further, the service request results in the access of the off-chain data or the storage of new off-chain data for storage node 400, but client 200 should not send the service request directly to storage node 400, hut to the service server 100. In one embodiment, the storage node 400 may also store identification information of the service server 100 and may ignore requests received from a computing device other than the service server 100.

The data that can be processed in an application executed on the client 200 is the original data, and the off-chain data is data that cannot be interpreted in the application. For example, when the original data is an image file, the off-chain data may be part of chunks that are pieces of the image file. Even if some of the chunks are leaked to the outside through unauthorized access to the storage node 400, the entire image cannot be restored.

In short, off-chain data stored in the storage node 400 is not meaningful data per se, but one or more off-chain data should be collected and restored to the original data by the service server 100 for processing by the application. And, the service server 100 uses on-chain data stored in the blockchain when restoring one or more off-chain data to the original data.

In other words, as already described, the blockchain node 200 ignores requests received from a computing device other than the service server 100, and thus restoring to the original data can be performed merely by a service server 100 capable of obtaining the on-chain data. In addition, the storage node 400 is set to ignore requests received from a computing device other than the service server 100, thereby preventing off-chain data from being leaked without permission. Even if the chain data is leaked without permission, the data managed by the data management system according to the present embodiment can be securely protected.

In some embodiments, the original data may be restored using all of the secret data stored in the security area of the service server 100 in addition to the on-chain data and the off-chain data. In this case, the on-chain data recorded in the blockchain is leaked by the operating organization of the blockchain node, and thus, even if the off-chain data is leaked, the original data cannot be restored without permission.

Further, the data management system according to the present embodiment reflects change provenance on the data without omissions in the blockchain. To this end, when the service server 100 receives a service request associated with the original data from a client, the service server 100 performs i) a first operation of accessing off-chain data stored in the storage node 400 or recording off-chain data in the storage node according to the service request, and ii) a second operation of sending a transaction proposal to one or more blockchain nodes 200 for a record associated with the service request to be stored in the blockchain.

The transaction proposal includes transaction contents according to the service request. The transaction contents may mean execution parameters of the smart contract.

The transaction contents may be received along with the service request or generated by the service server 100 using reference data received following the service request. The reference data may be, for example, metadata of the management target data, the entire management target data or part of the management target data. The reference data may be metadata of the management target data extracted by the service server 100 from the received management target data.

Figure 2:
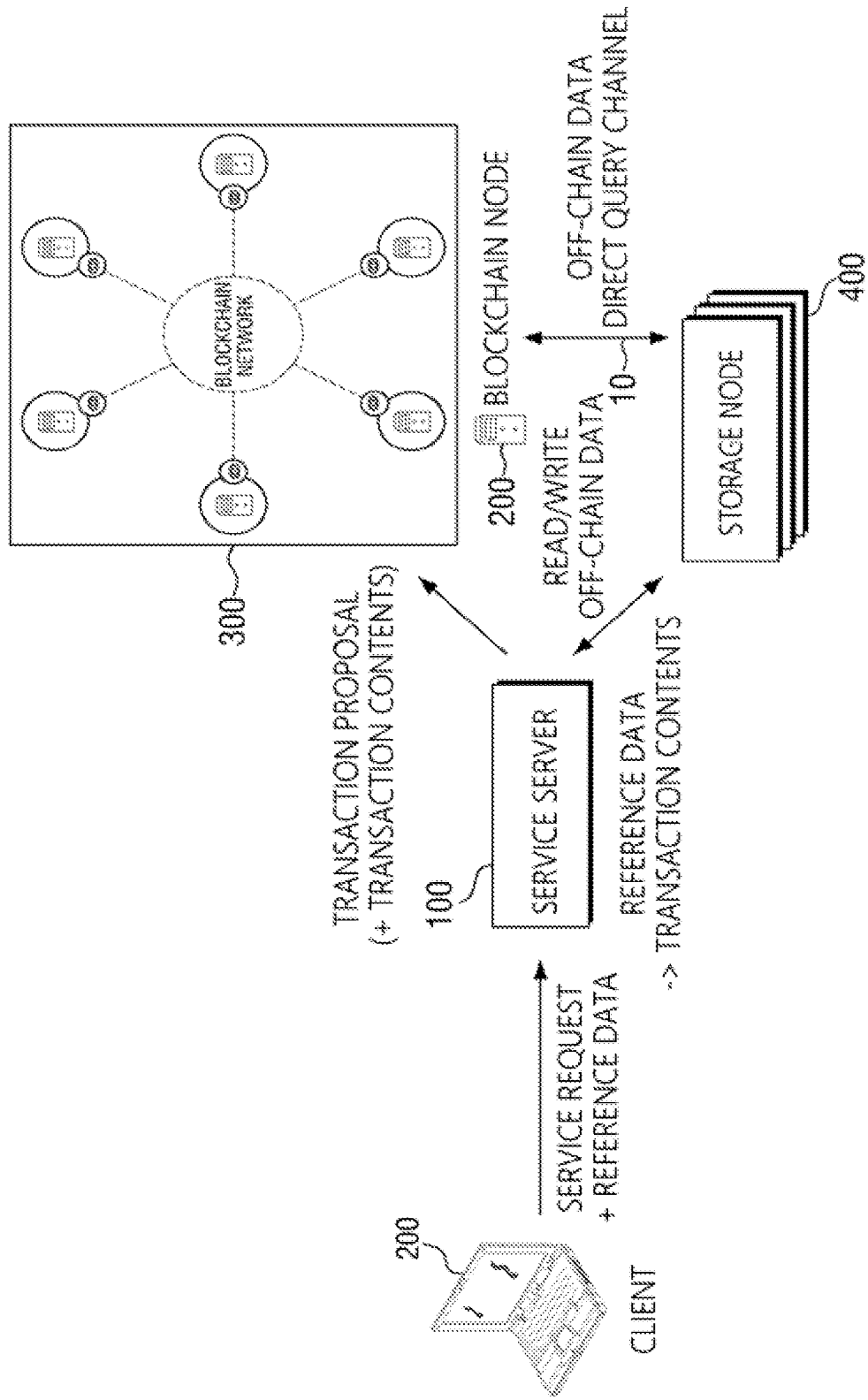

The blockchain node 200 receives the transaction proposal and executes a smart contract. The blockchain node 200 does not immediately update the ledger upon receiving the transaction proposal, but evaluate the transaction contents of the transaction proposal in view of the logic of the smart contract and the contents of the ledger stored by the blockchain node 200 and generate smart contract execution result reflecting the evaluation result. The blockchain node 200 may refer to off-chain data stored in the storage node 400 in the process of executing the smart contract. In this case, as shown in FIG. 2, the blockchain node 200 directly accesses the storage node through the off-chain data direct query channel 10, thereby improving the speed of querying off-chain data.

The blockchain node 200 sends an execution result of the smart contract and an endorsement of the blockchain node 200 to the service server 100 as a reply to the transaction proposal. The service server 100 collects the transaction proposal replies received from each blockchain node 200 and determines whether an agreement determination for the transaction proposal sent by the service server 100 is possible. The service server 100 may perform the agreement determination according to a predefined endorsement policy.

If the service server 100 determines that the agreement determination for the transaction proposal is possible, the service server 100 sends a transaction request to the blockchain node 200 for the transaction contents of the transaction proposal to be added to the ledger as a new transaction. For example, if the protocol of the blockchain is a hyperledger fabric, the transaction request will be sent to a node in charge of the ordering service of the blockchain node 200. The node in charge of the ordering service generates a block by collecting transaction requests, forwards the generated block to all the storage nodes (committing peer), and each storage node checks if every transaction in the forwarded block complies with each endorsement policy, and if there is no problem, the block is additionally connected to the existing blockchain.

The service server 100 may not access or record the off-chain data when an error occurs, such as an agreement determination is not possible, in the process of storing the record associated with the service request in the blockchain according to the above-described process. That is, when a service request is received from the client 200, the service server 100 confirms that the record associated with the service request is normally stored in the blockchain, and may send or receive the off-chain data with the storage node 400 to process the service request.

If there is an agreement determination for the transaction proposal, there is little chance that an error will occur in the process of adding the transaction to the blockchain. Using this, if the service server 100 determines that an agreement determination for the transaction proposal is possible, the service server 100 may access or record the off-chain data without waiting for the record associated with the service request to be stored in the blockchain, thereby improving the processing speed of the service request.

For example, if the service request is a registration request of new data or an update request of existing data, the service server 100 waits until a point, at which the determination of agreement success is possible using the response to the transaction proposal, and sends the off-chain data to be recorded/updated to the storage node 400 only if the determination of agreement success is possible.

Figure 3:
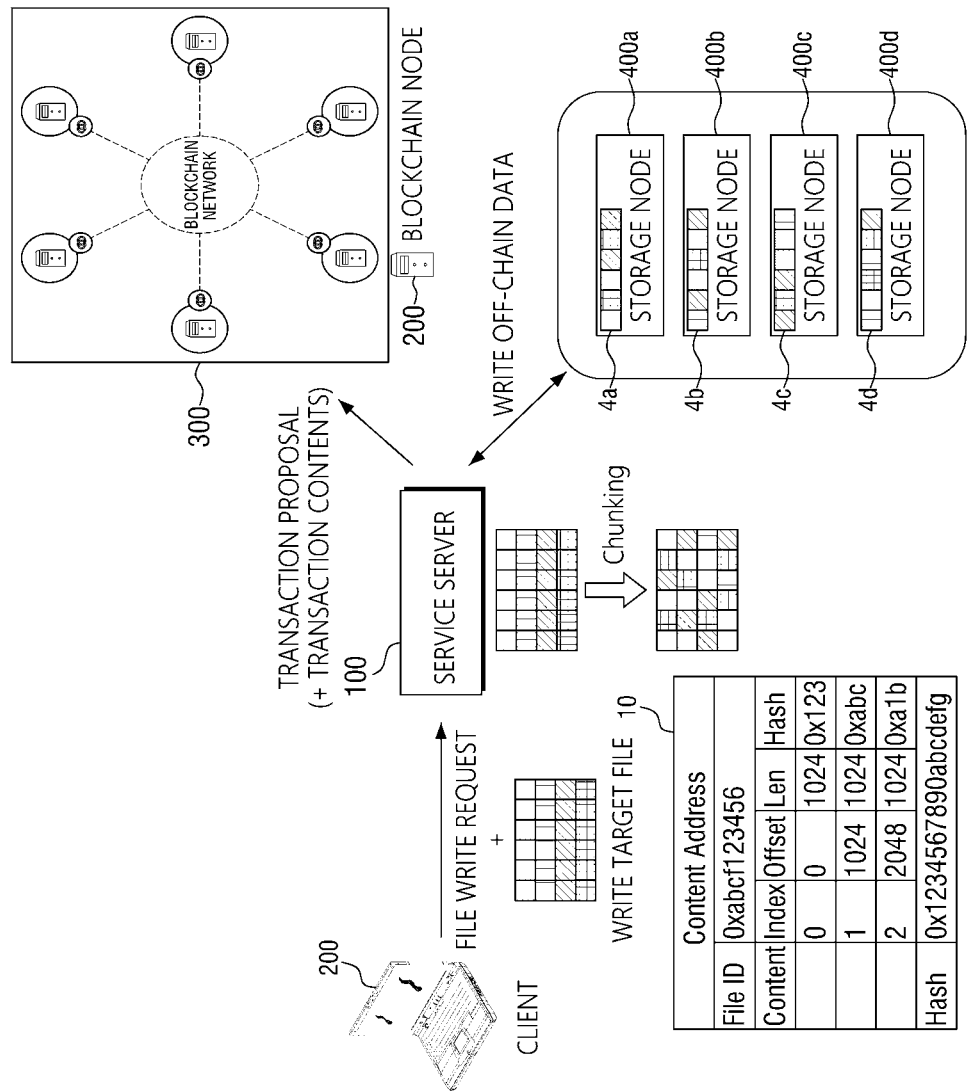
FIG. 3 is a diagram for describing an operation of a service server of a data management system according to some embodiments of the present invention.

As illustrated in FIG. 3, when a file write request is received from the client 200, the service server 100 may configure off-chair data by chunking a writing target file. In one embodiment, the service server 100 may shuffle the order of each chunk. In another embodiment, the service server 100 may configure the off-chain data by encrypting each chunk. In another embodiment, the service server 100 may configure off-chain data by encrypting a writing target file.

And, the service server 100 generates contents address information 15 including the address and verification value (hash value) of each off-chain data and the identifier and verification value of the entire file. Since the contents address information 15 is data recorded in the blockchain, that is, on-chain data, it is safe from manipulation.

The service server 100 generates a transaction proposal including the content address information 15 as the transaction contents as a file write request, and sends the transaction proposal to the blockchain node 200. As described above, the smart contract executed by the blockchain node 200 receives the transaction contents as a parameter and generates a return value. For example, whether the write requested file is already registered may be calculated in the smart contract. In the first embodiment, if the hash value of the entire file is not already registered, a return value indicating an agreement may be generated, thereby obtaining fast execution speed. In the second embodiment, if the ratio that matches the hash value of the chunk of the pre-registered file among the hash values of each chunk constituting the file is equal to or less than the reference value, a return value indicating an agreement is generated, thereby preventing duplicate registration even in case of that part are dissimilar.

The service server 100 collects the response to the transaction proposal, and as a result, if it is possible to determine the agreement success, each of the chunks 4a, 4b, 4c, 4d is distributed and stored in the storage nodes 400a, 400b, 400c, 400d.

The data management system according to some embodiments described above with reference to FIGS. 1 to 3 is combined with a dedicated storage system of an organization that operates a private blockchain in the private blockchain environment, thereby performing data CRUD (Create/Read/Update/Delete) history management with high reliability by a client within the organization. Further, as shown in FIG. 4, each organization may have a system configuration as needed. For example, organization A borrows a system configuration, in which the service server has more control authority by allowing the private blockchain network 300a to access the storage node 400a via the service server 100a, and organization B borrow a system configuration, in which the blockchain node of the private blockchain network can process the smart contract faster by allowing the private blockchain network 300b to directly access the storage node 400b via the off-chain data direct query channel 10. In this case, the service servers 100a and 100b are devices serving as both a service server of a private blockchain and a service server of the dedicated storage system.

The data management system according to some embodiments described above with reference to FIGS. 1 to 3 is combined with a dedicated storage system of an organization operating blockchain nodes in a public blockchain environment or an authorized blockchain environment that includes user identification/authentication services for each blockchain node, thereby performing data CRUD (Create/Read/Update/Delete) history management with high reliability by a client within the organization.

For example, it is supposed that the first organization constitutes a blockchain network along with a plurality of other nodes, and each node of the blockchain network performs node identification/authentication through a membership service, an authentication server, and the like. Only nodes of the first organization can constitute an individual channel within the blockchain network, and an individual blockchain separate from the shared blockchain that is matched to the channel and accessible by any member node of the blockchain network care be operated in the blockchain network. At this time, the data CRUD history management of the first organization can be achieved by recording the data CRUD history to the blockchain of the first organization that matches the channel consisting of nodes of the first organization joined to the blockchain network and connected to the internal network of the first organization, and storing the data managed by the data CRUD history in the dedicated storage node of the first organization as off-chain data.

In this case, the service servers 100a and 100b are devices serving as both a service server of the blockchain of the first organization and a service server of the dedicated storage system.

The operation of the data management system described above with reference to FIGS. 1 to 4 will be described in more detail with reference to FIGS. 5 to 9. For the convenience of understanding, the description is based on the situation that the management target of the data management system is a 'file', and a CRUD (Create/Read/Update/Delete) request related to the file is processed, and at the same time, the history is recorded in the block chain. Hereinafter, in order to prevent points of the description from being blurred, the matters already described above will be briefly described or omitted.

Figure 5:
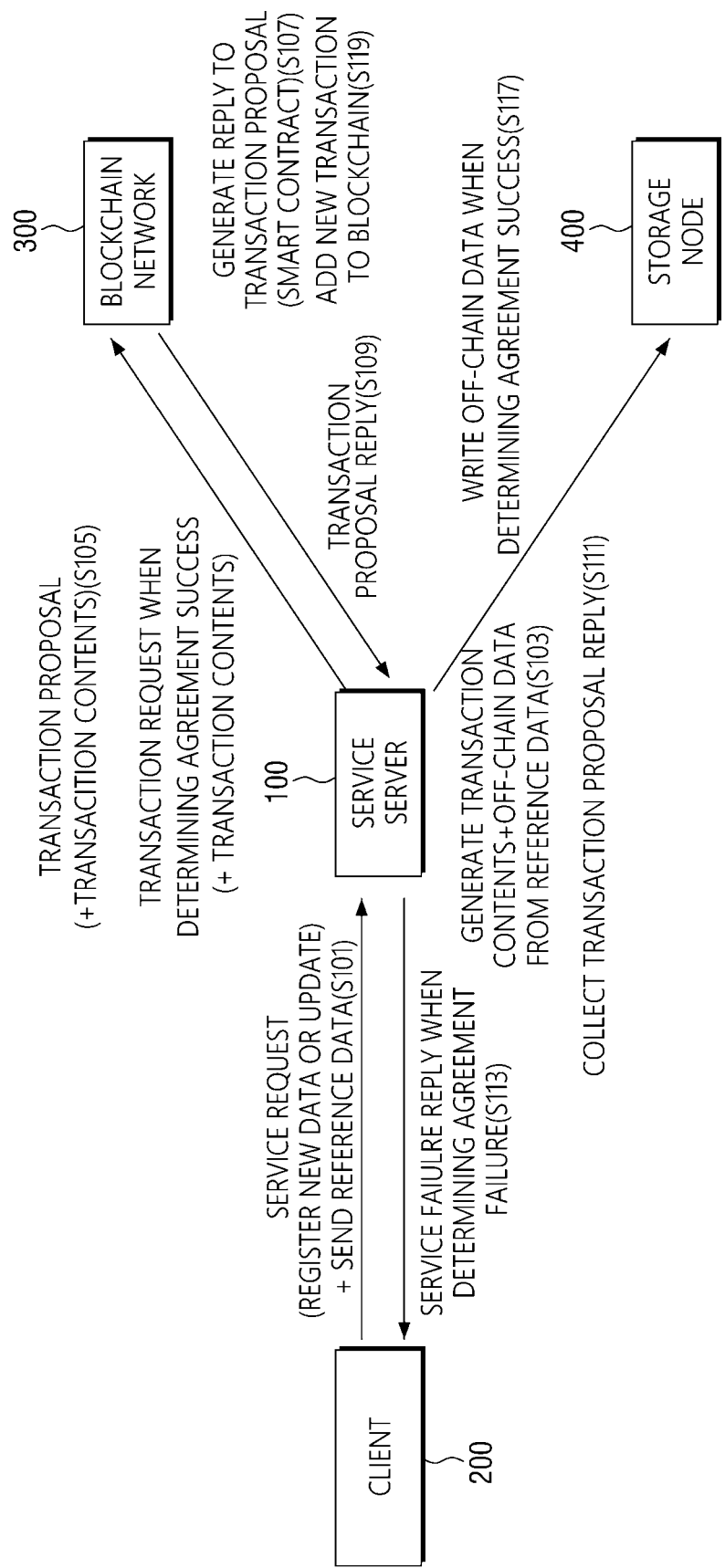
FIGS. 5 to 9 are diagrams for describing an operation according to some embodiments of the data management system described with reference to FIGS. 1 to 4.

As a first embodiment, when the service server 100 receives a request of storing a new file (Create) in a storage or an update request (Update) of an existing file stored in the storage node 400 from a client 200, the operation of the data management system according to the present embodiment will be described with reference to FIG. 5.

In this embodiment, the service server 100 receives a service request including reference data (a storage target file or an updated file) (S101), generates transaction contents and off-chain data from the reference data (S103), and sends a transaction proposal including the transaction contents to the blockchain network 300 (S105). When a reply of a transaction proposal (S107) generated in the blockchain network 300 is received (S109), the service server 100 collects it (S111), and if the agreement failure is determined as a result of the collection, the service server notifies the client of the service failure (S113). If the agreement success is determined as a result of the collection, the service server 100 sends a transaction request to the blockchain network 300 for a record associated with the service request to be recorded in the blockchain (S115). Further, the service server 100 stores the off-chain data in the storage node 400 (S117).

The data management system according to the present embodiment verifies whether the storage of a new file or the update of an existing file requested by a client is permitted through logic defined in a smart contract, and then simultaneously records the service request to the blockchain and stores the new file to the storage or updates the existing file only when the verification passes, thereby yielding the effect of completely blocking disallowed storage of a new file to the storage and the update of the existing file. For example, the writing of a file with disallowed attributes, a request by a user without file write/update permission, a duplicate storage request for a file that is the same as or more than the reference value similar to the existing file may be rejected by logic defined in the smart contract.

As a second embodiment, when the service server 100 receives a request for storing a new file in the storage from the client 200 (Create), an operation of first verifying redundancy of the new file will be described with reference to FIG. 6. The storage request may also be understood as registration to a data management system through a blockchain network.

In order to compare the identity between the existing file and the storage target file according to the service request received from the client 200, the storage target file may need to be sent to the service server 100. However, if it is determined that the storage target file, which the client 200 sends to the service server 100, is the same or similar to the file stored in the storage node 400, the time and cost inputted to the transmission of the storage target file is wasted.

When the service request received from the client 200 is a registration request of the storage target file, the service server 100 according to the present embodiment may send a transaction proposal to the blockchain network 300 several times while changing the transaction contents for judging whether the smart contract agrees with the registration request. At this time, the data size of the reference data necessary for generating the transaction contents included in the previous transaction proposal may be smaller than the data size of the reference data necessary for generating the transaction contents included in the next transaction proposal.

For example, the transaction contents included in the first transaction proposal may be generated using metadata of the storage target file. Next, when the agreement success for the first transaction proposal is determined, the service server 100 may receive the entire storage target file from the client 200 and use the entire received file to generate the transaction contents included in the third transaction proposal. By checking whether the metadata of the file is duplicated with each other in advance by using the metadata that does not have a large data size compared to the entire file, waste of the time and cost can be prevented compared to the case the duplication is found after sending the storage target file itself to the service server 100. This waste reduction effect is maximized as the data size of the storage target file increases.

The meta data of the storage target file may be modified in the client 200. For example, metadata, such as a file name, a version assigned to the file, and the like, may be modified by the user of the client 200. In this case, the result of checking the redundancy of the metadata may not be accurate. Thus, if the storage target file is the same as the file already stored in the storage node 400 but the metadata is different from each other, the redundancy of the file may be identified in the reply to the third transaction proposal. By the way, as mentioned above, if the data size of the storage target file is large, the waste due to the transmission of the storage target file is large. In order to further reduce such waste, the service server 100 may further generate a second transaction proposal before the third transaction proposal when the agreement success for the first transaction proposal is determined.

The second transaction proposal is a part of the storage target file, which may receive a portion determined by using metadata of the storage target file from the client 200 in advance, and include the transaction contents for identifying the redundancy of the received part. For example, the service server 100 may request and receive the file partial data corresponding to the offset area included in the reply to the first transaction proposal from the client 200, generate the transaction contents of the second transaction proposal including the verification value (hash value) of the file partial data, and determine the redundancy of the second transaction proposal. In view of the reply to the second transaction proposal, if the part of the storage target file is determined to be the same as the part of the file previously stored in the storage node 400, the service server 100 may not receive the entire storage target file, and reply that the service request fails.

In order to prevent only partially identical files from being denied registration by the second transaction proposal, identity verification for a plurality of parts may be performed through the second transaction proposal.

Figure 6:
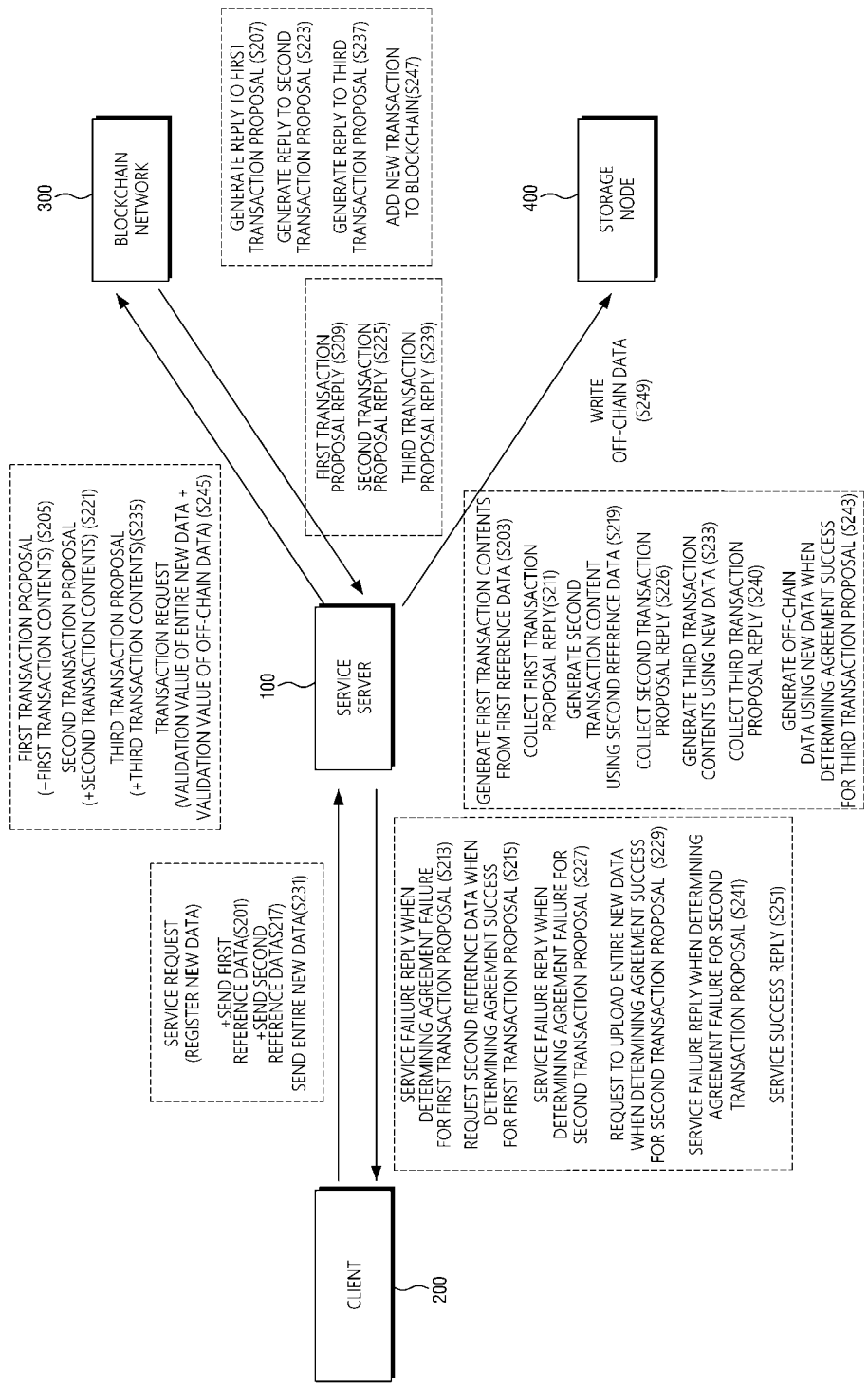

FIG. 6 illustrates the operation described above. It summarizes below.

The service server 100 receives the first reference data (metadata of the storage target file) (S201), generates the first transaction contents for the first transaction proposal using the first reference data (S203), sends the first transaction proposal including the first transaction contents to the blockchain network 300 (S205) to collect the identity verification results based on the first reference data (S207, S209, S211). The service server 100 notifies the client 200 of the service failure upon determining the agreement failure for the first transaction proposal (S213), and upon determining the agreement success for the first transaction proposal, requests the second reference data to the client 200 by using the information included in the reply to the first transaction proposal (S215).

Next, the service server 100 receives the second reference data (partial data of the storage target file) (S217), generates the second transaction contents for the second transaction proposal using the second reference data. (S219), and sends a second transaction proposal including the second transaction contents to the blockchain network 300 (S221) to collect the identity verification results based on the second reference data (S223, S225, S226). The service server 100 notifies the client 200 of the service failure upon determining the agreement failure for the second transaction proposal (S227), and request the third reference data (the entire storage target file) to the client 200 upon determining the agreement success for the second transaction proposal (S229).

Next, the service server 100 receives the third reference data (the entire storage target file) (S231), generates the third transaction contents for the third transaction proposal using the third reference data. (S233), and sends the third transaction proposal including the third transaction contents to the blockchain network 300 (S235) to collect the identity verification results based on the third reference data (S237, S239, S240). The service server 100 notifies the client 200 of the service failure upon determining the agreement failure for the third transaction proposal (S241), and generates off-chain data using the storage target file upon determining the agreement success for the third transaction proposal (S243). The service server 100 may generate the off-chain data, for example, by dividing the storage target file into a plurality of chunks or encrypting it.

Next, the service server 100 may send a transaction request including the information on the storage target file to the blockchain network 300 (S245) to add the history of storing the storage target file in the storage node 400 to the ledger as a new transaction (S247). The information on the storage target file may include information, such as a file identifier, a file verification value (hash value), an address of each chunk constituting the file, a verification value (hash value), and an order within the file.

Next, the service server 100 sends the off-chain data to the storage node 400 to be stored in the storage node 400. Unlike the one shown in FIG. 6, the service server may send the off-chain data to the storage node 400 prior to sending the transaction request to the blockchain network 300. If the service server 100 is notified of the storage success of the off-chain data from the storage node 400, the service server 100 may finally notify the client 200 of the service success (S251).

Figure 7:
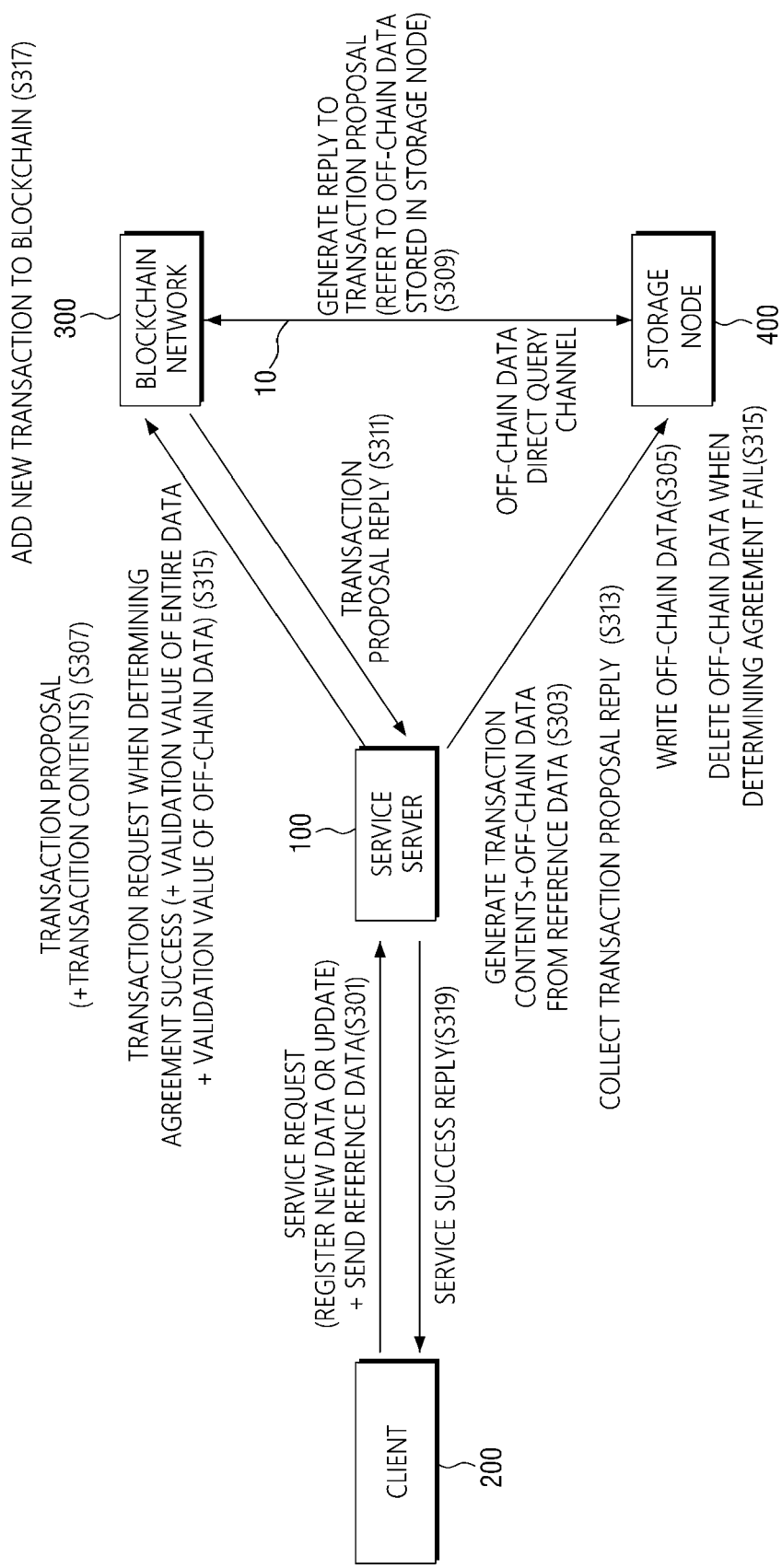

As a third embodiment, when the service server 100 receives a request for storing a new file in the storage (Create) or an update request of an existing file (Update) from the client 200, the operation of storing off-chain data of the new file or off-chain data related to updating of the existing file in the storage node 400 first and then verifying redundancy of the new file will be described with reference to FIG. 7.

In the present embodiment, the service server 100, upon receiving a new file storage request or an existing file update request (S301), waits until receiving the new file or the updated existing file is completed. Thereafter, the service server 100 generates off-chain data using the new file or the updated existing file (S303), and stores the off-chain data in the storage node 400 (S305).

Next, the service server 100 sends a transaction proposal including the transaction contents generated using the off-chain data to the blockchain network 300. The blockchain network 300 receiving the transaction proposal executes a smart contract. In the execution process of the smart contract, off-chain data stored in the storage node 400 is queried through the off-chain data direct query channel 10, and a reply of the transaction proposal is generated based on the queried data (S309).

That is, in the present embodiment, whether the storage target new file or the existing file update according to the service request conforms to the smart contract is determined by directly querying off-chain data of the storage node 400 in the smart contract. For this reason, in this embodiment, the off-chain data is first stored in the storage node 400. In this case, it can yield the effect of coping with smart contracts that are strictly implemented to generate a reply to a transaction proposal by directly referring to off-chain data stored in a storage.

Next, the service server 100 collects the reply (S311) of the transaction proposal (S313), and determines whether it is the agreement success for the transaction proposal using the collection result. When the agreement success is determined, the service server 100 may immediately notify the client 200 of the service success (S319). However, when the agreement failure is determined, the service server 100 automatically deletes off-chain data stored in the storage node 400 to roll-over (S315).

When the service request is a request for storing a new file in a storage (Create) that causes the recording of off-chain data to the storage node 400 or an update request of an existing file (Update), the first embodiment described with reference to FIG. 5 performs pre-validation of service request processing by the smart contract, and the third embodiment described with reference to FIG. 7 first stores off-chain data in the storage node, and then execute the smart contract that performs verification by referring to the data stored in the storage node.

In some embodiments, when the service request is a request for storing a new file in a storage (Create) that causes the recording of off-chain data to the storage node 400 or an update request of an existing file (Update), any one of the first embodiment and the third embodiment may be automatically selected and performed according to the executed smart contract.

In this case, when the service request is a registration request of new data or an update request of existing data, the service server 100 may automatically determine a processing type of the service request as either pre-agreement or pre-upload. For example, the service server 100 may determine the processing type of the service request as the processing type matched to the identifier of the smart contract.

The service server 100 sends a transaction proposal to the blockchain node for the record associated with the service request to be stored in the blockchain when the processing type of the service request is determined as pre-agreement, and sends the off-chain data to the storage node only when the determination of the agreement success is possible by using the response to the transaction request. When the processing type of the service request is determined as pre-upload, the service server 100 records the new off-chain data to the storage node, and then sends a transaction proposal to the blockchain node for the record associated with the service request to be stored in the blockchain.

Figure 8:
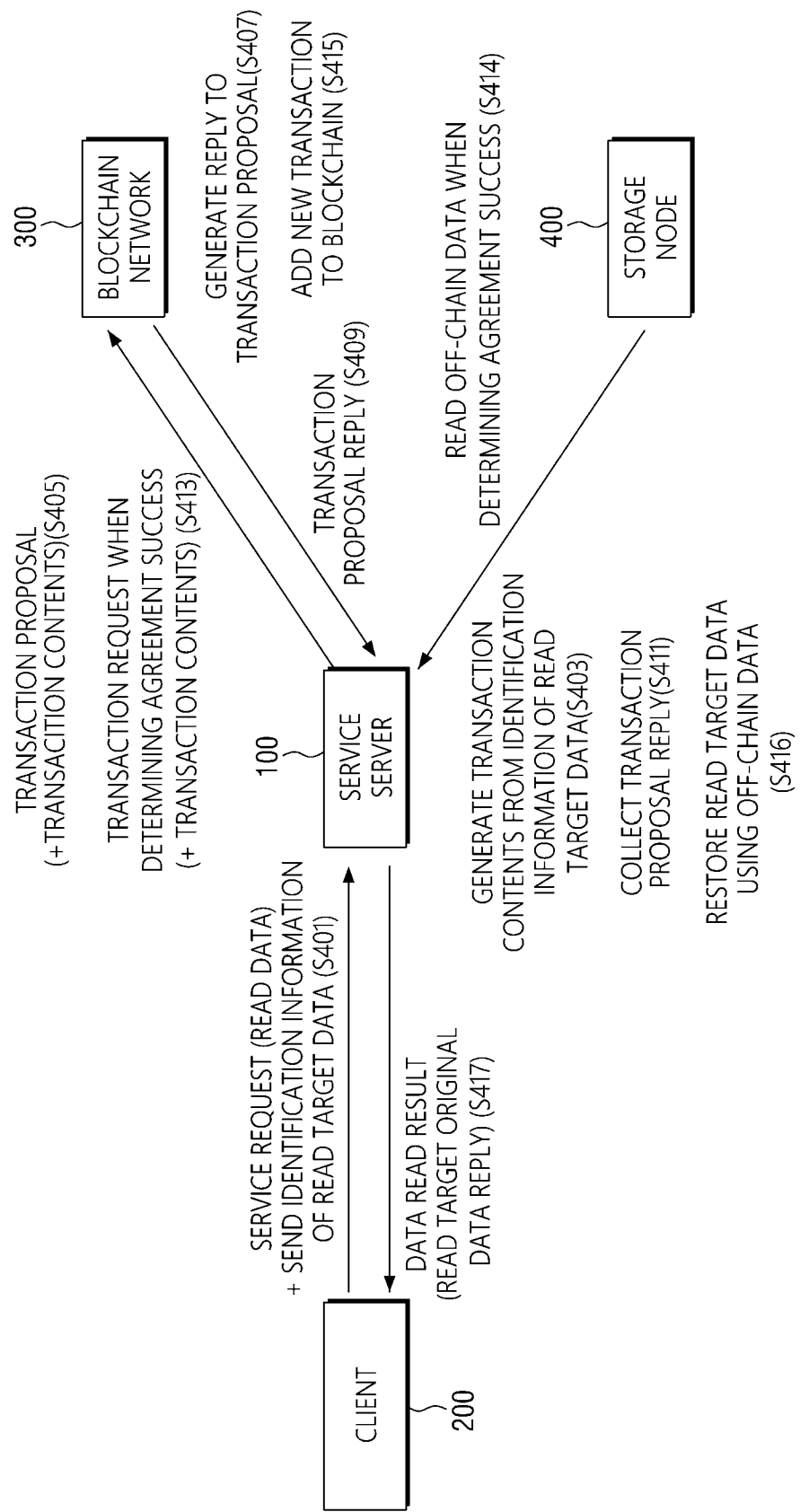

As a fourth embodiment, an operation when the service server 100 receives a file read request from the client 200 will be described with reference to FIG. 8. This embodiment may be equally applicable when receiving a file download request.

In the present embodiment, when a service request including identification information of a read target file as reference data is received (S401), the service server 100 generates transaction contents using the reference data (S403). The reference data may further include identification information on a file read request subject. That is, the transaction contents may include information on the file read request subject. The file read request subject may be, for example, at least one of identification information of the client 200, user identification information of the client 200, and blockchain membership identification information of the organization, to which the client 200 belongs. Next, the service server 100 sends a transaction proposal including the transaction contents to the blockchain network 300 (S405).

The blockchain network 300 receives the transaction proposal and executes a smart contract to generate a reply to the transaction proposal (S407). In the smart contract, verification may be performed as to whether the file read request subject has a read permission or a download permission for a read target file. Further, in the smart contract, the number of query of the read target file may be updated. The service server 100 collects a reply (S409) to the transaction proposal (S411), and upon determining the agreement success as a result of the collection, sends a transaction request to the blockchain network 300 for the transaction contents to be recorded in the ledger of the blockchain as a transaction. The blockchain network 300 receiving the transaction request will add a new transaction including the transaction contents to the ledger (S415).

And, the service server 100 queries address information of each of the off-chain data corresponding to the identification information of the read target file in the blockchain network 300, and reads each of the off chain data from the storage node 400 (S414). Next, the service server 100 restores the read target file using the read off-chain data, and sends the restored file to the client 200 (S417).

In this embodiment, the data management system reads off-chain data required to restore the read target file from the storage node 400 after verifying whether the file read request subject has read or download permission for the read target file, thereby yielding the effect of completely blocking unauthorized file queries or leaks.

Figure 9:
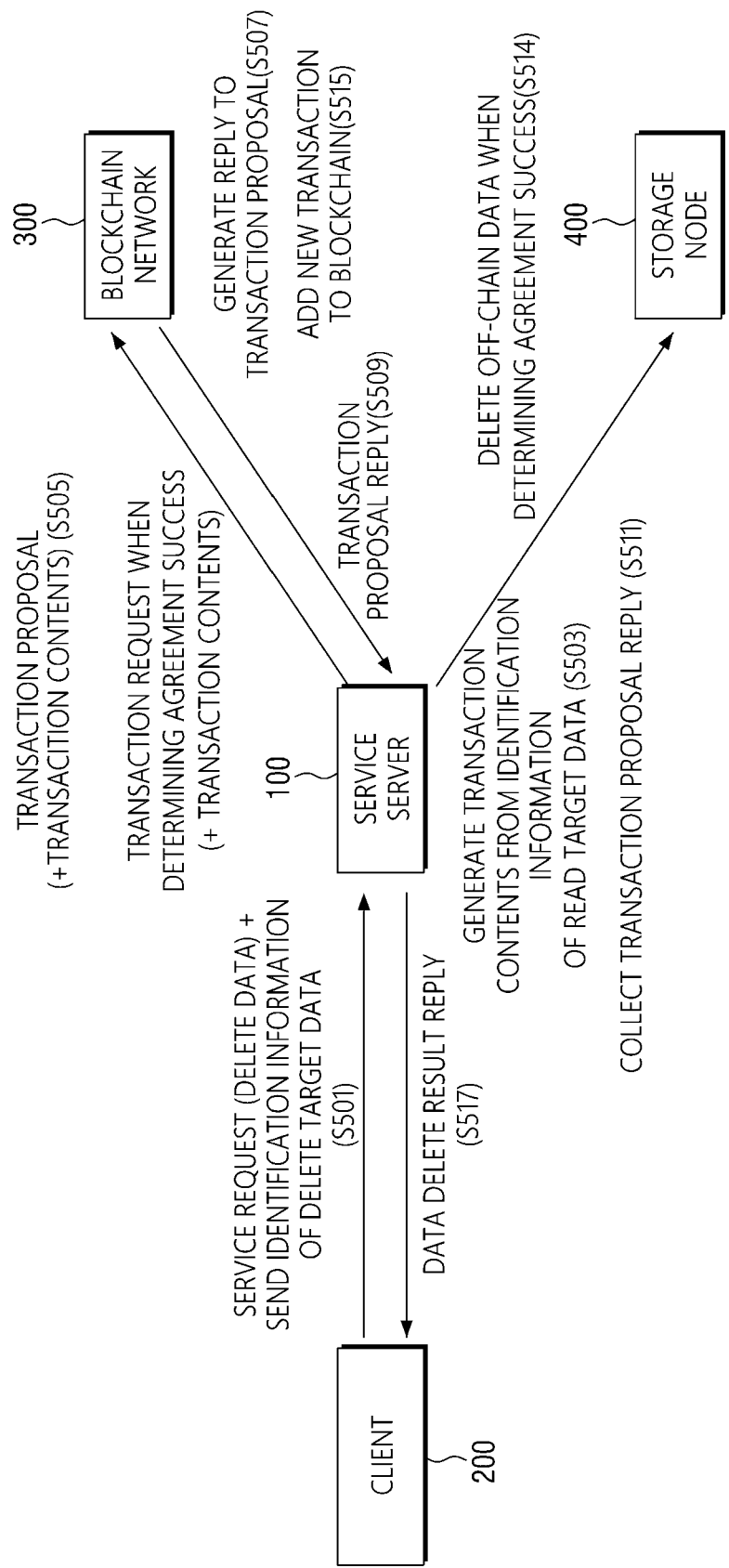

As a fifth embodiment, an operation when the service server 100 receives a file deletion request (Delete) from the client 200 will be described with reference to FIG. 9.

In the present embodiment, when a service request including identification information of a deletion target file as reference data is received (S501), the service server 100 generates transaction contents using the reference data (S503). The reference data may further include identification information on a file deletion request subject. That is, the transaction contents may include information on the file deletion request subject. The file deletion request subject may be, for example, at least one of identification information of the client 200, user identification information of the client 200 and blockchain membership identification information of the organization, to which the client 200 belongs. Next, the service server 100 sends a transaction proposal including the transaction contents to the blockchain network 300 (S505).

Meanwhile, the transaction contents may further include information on a deletion type specified by the client 200 and included in the reference data. The first type of the deletion type may be deletion of only the deletion target file, and the second type of the deletion type may be deletion of both the deletion target file and the forked file.

The forked file refers to a file generated as a result of that fork is requested as a sharing type when a file sharing request is made. The owner of the forked file has separate and unique permissions from the original file from the time of the fork. However, since a fork typed file sharing request is also recorded in the blockchain as a transaction, a file forked from the deletion target file can be tracked on the blockchain. For example, if file B and file C are forked from file A and file D is forked from file C, if the deletion of file A is requested from the client 200 in the second type, all of file A, file B, file C and file D will be deleted. However, the deletion of the forked file may require the consent of the owner of the forked file, and whether the consent of the owner of the forked file is required may be determined according to the permission of the file deletion request subject or whether the logic of the smart contract is implemented.

The blockchain network 300 receives the transaction proposal and executes a smart contract to generate a reply to the transaction proposal (S507). In the smart contract, verification may be performed as to whether the file deletion request subject has deletion permission or download permission for a deletion target file. The service server 100 collects a reply (S509) for the transaction proposal (S511), and upon determining the agreement success as a result of the collection, sends a transaction request to the blockchain network 300 for the transaction contents to be recorded in the ledger of the blockchain as a transaction. The blockchain network 300 receiving the transaction request will add a new transaction including the transaction contents to the ledger (S515).

And, the service server 100 obtains address information of off-chain data constituting the deletion target file from the blockchain network 300 using the deletion target file identification information. Then, the service server 100 deletes all off-chain data constituting the deletion target file using the address information of the off-chain data (S514) and returns the deletion result to the client 200.

In the present embodiment, the data management system proceeds with the deletion of off-chain data constituting the deletion target file after verification whether the file deletion request subject has the delete permission for the deletion target file, thereby yielding the effect of completely blocking unauthorized file deletion.

Next, the configuration and operation of a data management system according to another embodiment of the present invention will be described.

Figure 10:
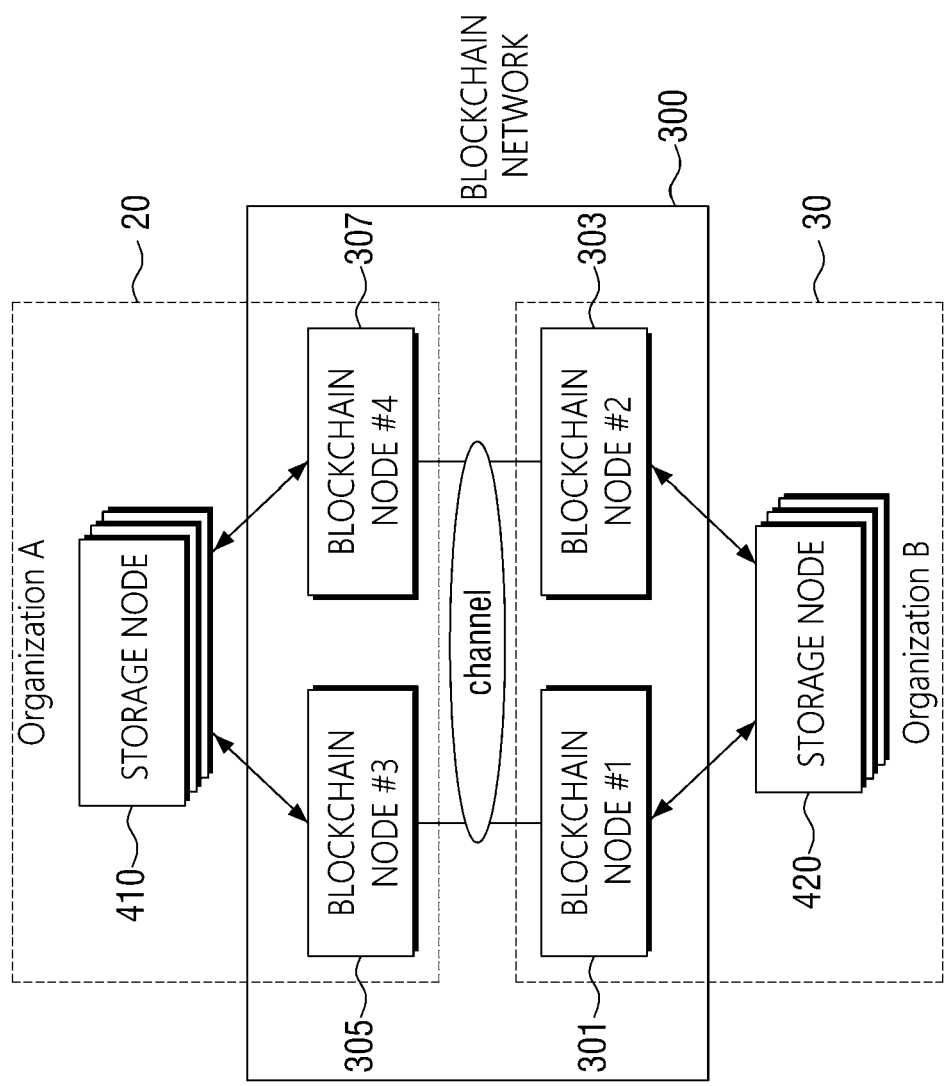
FIGS. 10 to 14 are configuration diagrams of a data management system according to another embodiment of the present invention.

First, it will be described with reference to FIG. 10.

The data management system according to the present embodiment includes at least one of a blockchain node #3 305 and a blockchain node #4 307 of the institution A 20 configured to store a blockchain, in which on-chain data is recorded, at least one of blockchain node #1 301 and blockchain node #2 303 of institution B 30 connected to the same channel as blockchain node #3 305 and blockchain node #4 330 to constitute a blockchain network 300, a storage node 410 dedicated to the institution A for storing off-chain data of institution A 20 for the blockchain and a storage node 420 dedicated to the institution B for storing off-chain data of institution B 20 for the blockchain.

At this time, the blockchain node #3 305 and the blockchain node #4 307 belonging to the institution A 20 query the storage node 410 dedicated to the institution A 20, and the blockchain node #1 301 and the blockchain node #2 303 belonging to the institution B 30 query the storage node 420 dedicated to the institution B 30. That is, the blockchain node #3 305 and the blockchain node #4 307 belonging to the institution A 20 do not query the storage node 420 dedicated to the institution B 30, and blockchain node #1 301 and the blockchain node #2 303 belonging to the institution B 30 do not query the storage node 410 dedicated to the institution A 20.

In a consortium blockchain, which is constituted by assembling blockchain nodes belonging to different organizations, the data management system according to the present embodiment supports for on-chain data to be shared between different organizations, but for off-chain data to be selectively shared with different organizations.

Further, the data management system according to the present embodiment, when the blockchain node executes the smart contract, only the storage nodes in the organization are inquired, which yields the effect of getting the right smart contract execution result according to the situation of the organization although the smart contract logic of the consortium blockchain is the same regardless f the organization.

Figure 11:
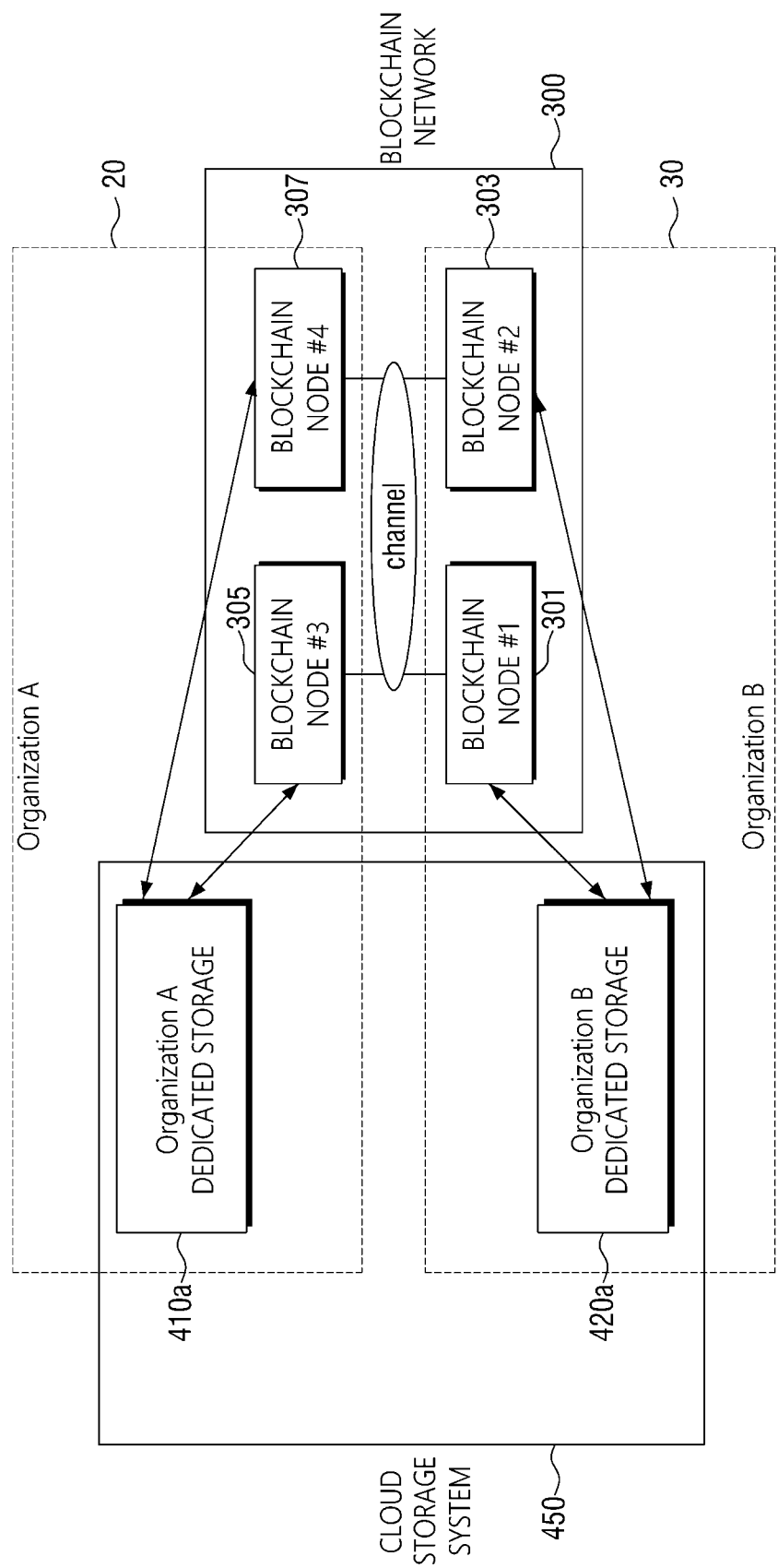

The data management system according to the present embodiment may include a storage dedicated to each organization set in the cloud storage system 450 outside the organization internal network. As shown in FIG. 11, the data management system according to the present embodiment may include an organization A dedicated storage 410*a* and an organization B dedicated storage 420*a*. Also in this case, the blockchain node #3 305 and the blockchain node #4 307 belonging to the institution A 20 query the storage 410*a* dedicated to the institution A 20, and the blockchain node #1 301 and the blockchain node #2 303 belonging to the institution B 30 query the storage 420*a* dedicated to the institution B 30.

Figure 12:
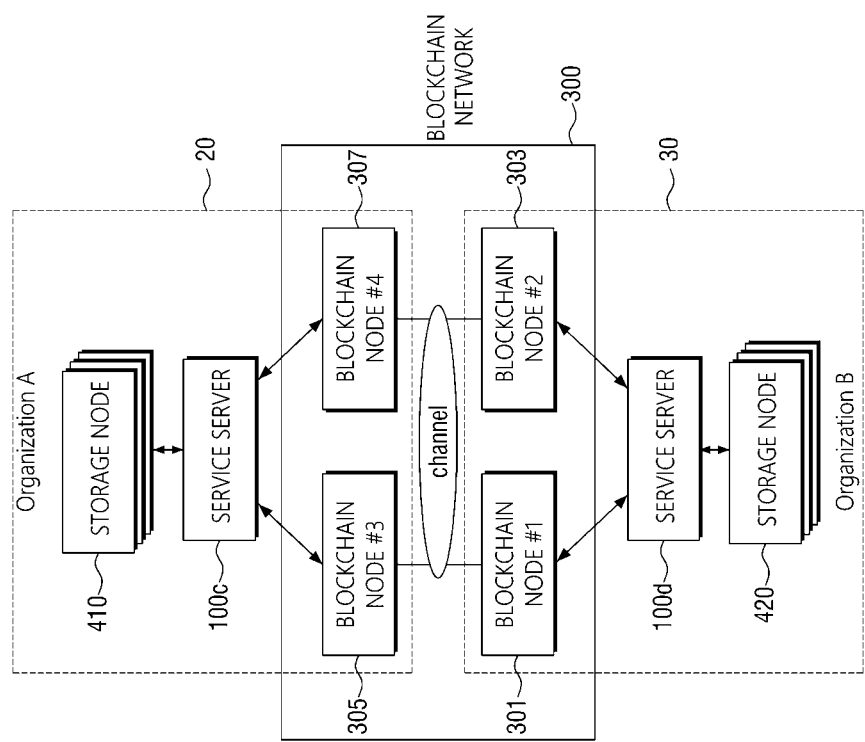

Further, as shown in FIG. 12, the data management system according to the present embodiment may further include a service server for each institution dedicated to processing a service request from a client of each institution.

For example, the data management system according to the present embodiment may further include the service server 100*c* of the institution A 20 and the service server 100*d* of the institution B 30.

When the service server 100*c* of the institution A 20 receives a service request associated with the original data from a client of the institution A 20, it may i) access the off-chain data stored in the storage node 410 of the institution A 20 or record off-chain data in the storage node 410 according to the service request and ii) send a transaction proposal to at least some of the blockchain node #3 305 and blockchain node #4 307 for the record associated with the service request to be stored in the blockchain.

When the service server 100*d* of the institution B 30 receives a service request associated with the original data from a client of the institution B 30, it may i) access the off-chain data stored in the storage node 420 of the institution B 30 or record off-chain data to the storage node 420 according to the service request and ii) send a transaction proposal to at least some of the blockchain node #1 301 and blockchain node #2 303 for the record associated with the service request to be stored in the blockchain.

The original data may be generated by the service servers 100*c* and 100*d* using the off-chain data and the on-chain data recorded in the blockchain. In some embodiments, the original data may be restored using all of the secret data stored in the security area of the service server 100 in addition to the on-chain data and the off-chain data.

The data management system according to the present embodiment reflects the change provenance of the data without omission in the blockchain, and provides the effect that the original data is not easily leaked even if the off-chain data is omitted through hacking to the storage nodes 410 and 420.

Figure 13:
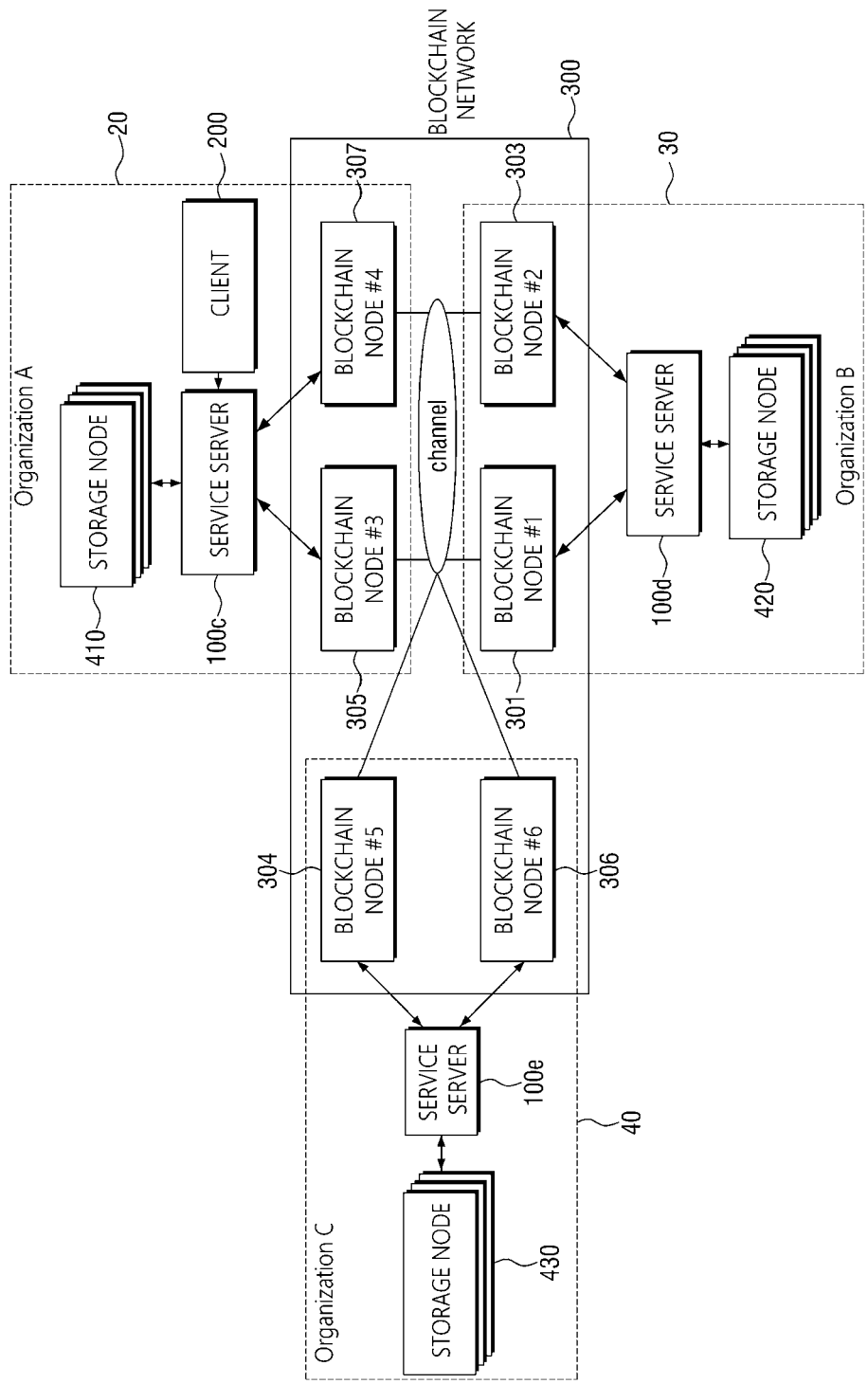

As shown in FIG. 13, the data management system illustrated in FIG. 12 may be applied to a consortium blockchain constituted by three institutions, or may be applied to a consortium blockchain constituted by four or more institutions.

Figure 14:
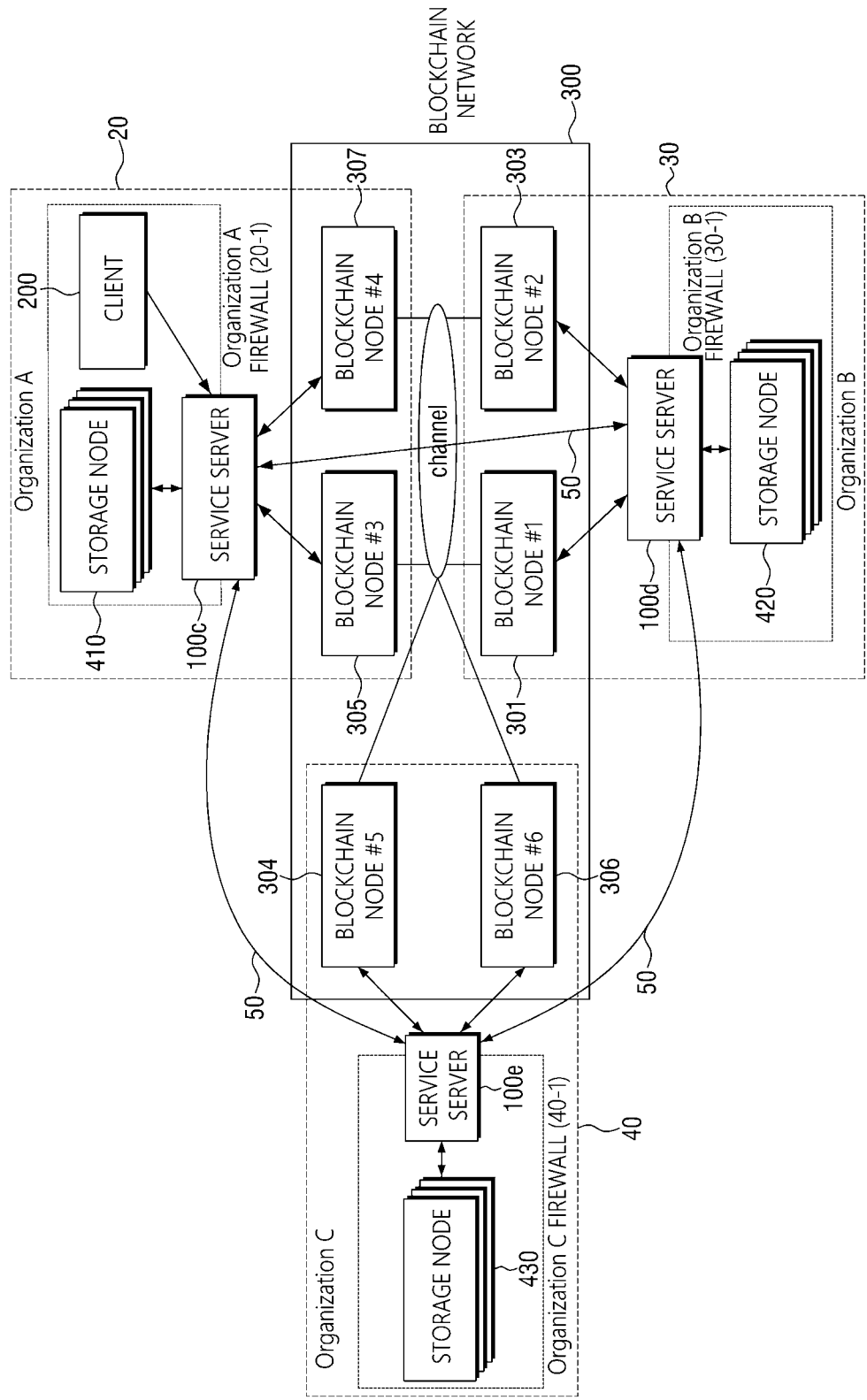

Further, the data management system according to some embodiments may be applied to an environment, in which a storage node is located in an internal network protected by a firewall. That is, as shown in FIG. 14, even if the storage node 410 is located in an internal network protected by the firewall 20-1 of the organization A 20, the storage node 420 is located in the internal network protected by the firewall 30-1 of the organization B 30 and the storage node 430 is located in the internal network protected by the firewall 30-1 of the organization C 30, the file shared with other organizations be copied between the storage nodes 410, 420, 430.

At this time, the service servers 100*c*, 100*d*, 100*e* of each organization may perform transmission and reception of off-chain data for the copy of the shared files between organizations through the communication path 50.

At this time, unlike the blockchain nodes 301, 303, 304, 305, 306, and 307 of the blockchain network 300, in which the on-chain data is automatically synchronized due to the nature of the blockchain, the storage nodes 410, 420, 430 send only off-chain data of files set to be shared with other organizations to the storage nodes 410, 420, 430 of the other organizations since the off-chain data should be selectively shared with other organizations.

Hereinafter, some embodiments related to data sharing between each of organizations will be described with reference to FIG. 14. For convenience of understanding, the shared object is described as a file.

The data sharing system according to the present embodiment may support both an active method of copying a file to a storage node dedicated to other organization at the same time as file registration and a passive method of requesting sharing at an organization other than the owning organization of the file for a file already registered, as a file sharing method.

For example, a situation, in which the file X uploaded by the client 200 to the service server 100*c* is shared with the organization B 30 at the same time it is stored in the storage node 410 in an active manner, is described. Since both storage node 410 of organization A and storage node 420 of organization B are located inside firewalls 20-1 and 30-1, the storage node 410 of organization A cannot directly send off-chain data of file X to the storage node 420 of organization B. At this time, if the service server 100*c* or 100*d* of each organization sets a packet that is a receiver or a sender as a packet to be passed by the firewalls 20-1 and 30-1, the storage node 410 of the organization A can send the off-chain data of file X to the storage node 420 of organization B sequentially via the service server 100*c* of the organization A 20, the communication path 50 between the service servers and the service server 100*d* of the organization B 30.

Meanwhile, as described with reference to FIG. 11, when the off-chain data of each organization is implemented on a cloud storage system and there is no separate firewall protecting the storage, the copy speed can be accelerated by copying off-chain data between each storage node in the p2p method for file sharing between organizations.

On the other hand, a case where there is a sharing request of the passive method will be described. When the sharing request is received from the client 200 of the organization A 20 to the service server 100*c* for the file Y stored in the storage node 420 of the organization B 30 with ownership of the organization B 30, the service server 100*c* sends a transaction proposal including the transaction contents according to the sharing request to the blockchain node #3 305 and the blockchain node #4 307. Assuming that the transaction proposal is determined to be agreed without any problem and added as a transaction to the ledger of the blockchain, it will be shared with blockchain node #1 301 and blockchain node #2 303 that there is a sharing request of organization A 20 for the file Y.

The service server 100*d* may check a new transaction of the blockchain in order to periodically monitor the sharing request for the file Y, which the organization B 30 owns. As a result, the service server 100*d* finds that there is a sharing request of the organization A 20 for the file Y, and receives whether to accept the sharing request from a client (not shown) of the organization B 30. If the sharing request is accepted, the service server 100*d* sends off-chain data of the file Y stored in the storage node 420 to the storage node 410 through the service server 100c.

Meanwhile, the sharing request may be a request for fork as a sharing type. In this case, the forked original data will be recorded in the blockchain as independent data of organization A 20.

In some embodiments, when there is a transaction shared on the blockchain from the first organization to the second organization, and then the first original data, whose share is supposed to be maintained, is deleted from the storage node of the second organization, periodically/aperiodically the storage node of the second organization may automatically receive at least some off-chain data of the first original data from the storage node of the first organization. For example, each organization's service server may periodically execute a batch process that checks whether the off-chain data of the shared original data is stored in a storage node in the organization, or receive off-chain data, which does not exist, from the storage nodes of the sharing organization if some of the off-chain data of the original data does not exist in the storage node in the organization.

Next, the operation of the service server 100c, 100d, 100e, when a service request associated with a file in the state of being shared by a plurality of organizations is received, will be described.

In one embodiment, the service server may send a transaction proposal associated with the service request only to nodes in the organization, where the file is shared. For example, if file Z is shared only with organization A 20 and organization C 40, when the update request of file Z is received from client 200 of organization A 20, service server 100c may send the transaction proposal associated with the update request only to the service server 100e of the organization C 40.

In this case, according to the operation state of the service server 100d of the organization B 30, which has no permission with respect to the file Z, it is possible to prevent the execution result reply of the smart contract to the update request from being delayed. For example, in the organization B 30, the data management task of other organization may be prevented from being paralyzed by acts such as turning off the service server 100d intentionally to disturb the work of other organization.

In another embodiment, the service server may send a transaction proposal associated with the service request to all smart contract execution nodes of the blockchain. In this case, the smart contract logic may include logic for returning a consent response without condition to all transaction proposals associated with data unshared with the institution, to which the blockchain node executing the smart contract belongs.

Figure 15:
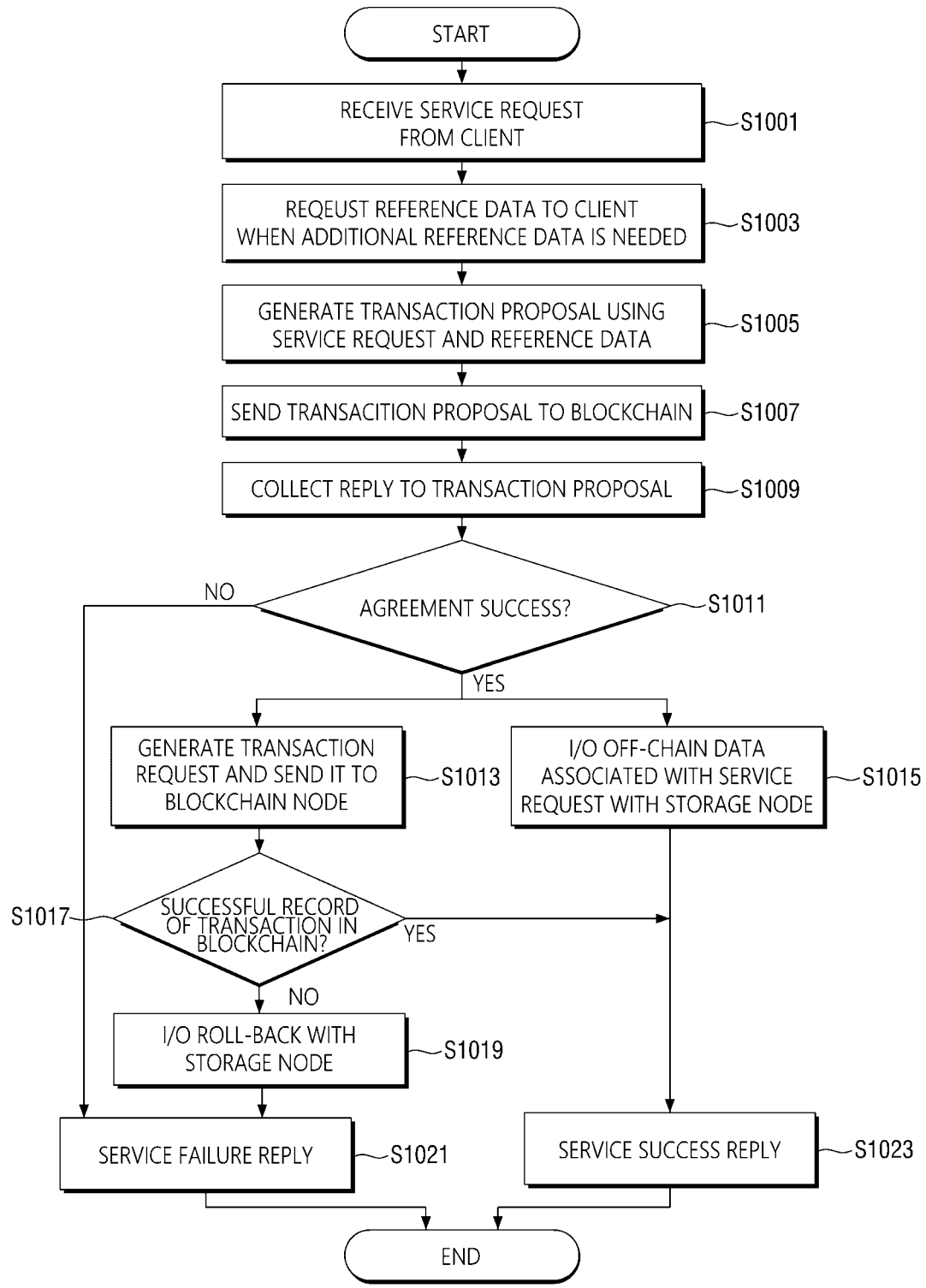
FIG. 15 is a flowchart of a blockchain based data management method according to another embodiment of the present invention.

Hereinafter, a data management method according to another embodiment of the present invention will be described with reference to FIG. 15. The method described with reference to FIG. 15 may be executed by a computing device. For example, the computing device may be a service server described with reference to FIGS. 1 to 14. In the following description of the method according to the present embodiment, when the subject of the operation is not specified, the subject of the operation is the computing device. Further, in order to avoid blurring, the point of the specification and obstructing understanding, duplicated descriptions of the matters described with reference to FIGS. 1 to 14 will be omitted.

In step S1001, a service request is received from a client. Reference data may be included in the service request, or reference data additionally determined as being necessary in step S1003 may be requested to the client. Next, a transaction proposal is generated for execution of the smart contract for determining whether the service request can be processed (S1005), and sent to the blockchain node (S1007).

In step S1009, responses to the transaction proposal are collected (endorsement collection). As a result of the collection, when it is determined as the agreement success for the transaction proposal, that is, when it is determined that the service request may be processed, off-chain data associated with the service request is inputted and outputted with the storage node (S1015), and the transaction request is sent to the blockchain node for the transaction proposal to be added as a transaction to the ledger (S1013). If a problem occurs during the verification process that is additionally performed by the blockchain storing the ledger and the transaction is not recorded in the blockchain (S1017), the input/output of the off-chain data with the storage node is rolled back to its original state, thereby maintaining consistency between the data provenance record according to the ledger and the off-chain data stored in the storage node (S1019).

When the service request fails to agree as a result of the smart contract execution for the transaction proposal (S1011) or when the agreement successes as a result of the smart contract execution but a problem occurs in the verification process that is additionally performed by the blockchain storing the ledger and thus the transaction is not recorded in the blockchain (S1017), it will not be processed (S1021), otherwise it will be processed normally (S1023).

Hereinafter, an exemplary computing device 500 that can implement an service server, client, storage node or blockchain node, according to various embodiments of the present disclosure will be described with reference to FIG. 16.

Figure 16:
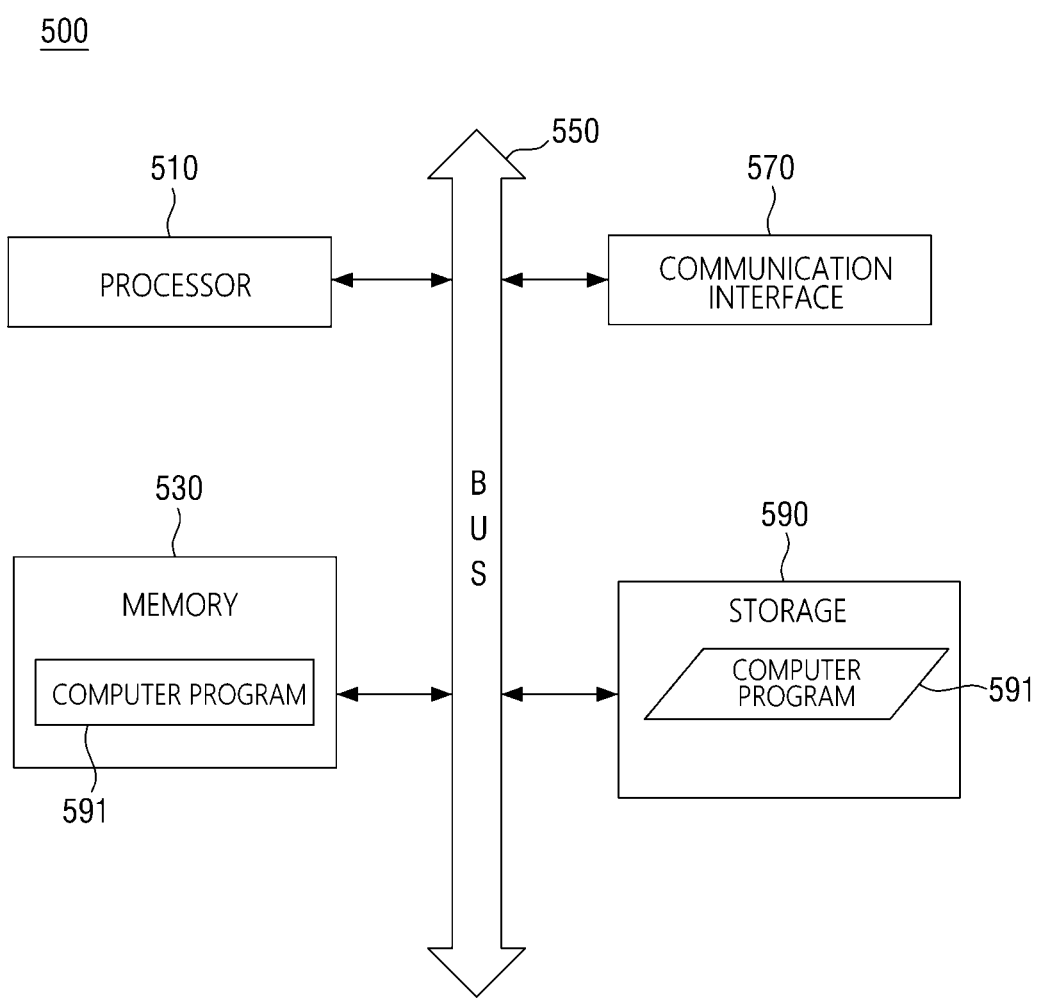
FIG. 16 is a block diagram of an exemplary computing device that may implement a device/system according to various embodiments of the present invention.

FIG. 16 is an example hardware diagram illustrating a computing device 500.

As shown in FIG. 16, the computing device 500 may include one or more processors 510, a bus 550, a communication interface 570, a memory 530, which loads a computer program 591 executed by the processors 510, and a storage 590 for storing the computer program 591. However, FIG. 16 illustrates only the components related to the embodiment of the present disclosure. Therefore, it will be appreciated by those skilled in the art that the present disclosure may further include other general-purpose components in addition to the components shown in FIG. 16.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. For example, when the computer program 591 is loaded into the memory 530, the logic (or the module) as shown in FIG. 4 may be implemented on the memory 530. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to comprise a communication module well known in the art of the present disclosure.

The storage 590 can non-temporarily store one or more computer programs 591. The storage 590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure are implemented. When the computer program 591 is loaded on the memory 530, the processor 510 may perform the methods/operations in accordance with various embodiments of the present disclosure by executing the one or more instructions.

So far, various embodiments included in the technical features of the present disclosure and effects according to the embodiments have been described with reference to FIGS. 1 to 16. The computer readable recording medium may be, for example, a removable recording medium (CD, DVD, Blu-ray disc, USB storage device, removable hard disk) or a fixed recording medium (ROM, RAM, computer equipped hard disk). The computer program recorded on the computer readable recording medium may be transmitted to other computing device via a network such as internet and installed in the other computing device, thereby being used in the other computing device.

In the above description, it is described that all the components constituting the embodiments of the present disclosure are combined or operated as one, but the technical features of the present disclosure are not limited to these embodiments. That is, within the scope of the present disclosure, all of the components may be selectively combined and operated in one or more combinations.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A data management system comprising:
a blockchain node configured to store on-chain data on blockchain; and
a service server configured to receive a service request associated with original data from a client,
wherein the service server comprises a processor, a memory for loading a computer program executed by the processors, and a storage for storing the computer program;
the computer program comprises instructions for implementing operations comprising i) accessing off-chain data stored in a storage node or recording off-chain data in the storage node according to the service request, and ii) sending a transaction proposal to the blockchain node for a record associated with the service request to be stored in the blockchain;
the storage node is configured to store off-chain data to be restored to original data by the service server;
the service server, when the service request is a registration request of new data or an update request of existing data, records new off-chain data in the storage node according to the service request and sends a transaction proposal to the blockchain node for a record associated with the service request to be stored in the blockchain; and
the blockchain node refers to the new off-chain data recorded in the storage node to generate a response to the transaction proposal.

2. The data management system of claim 1, wherein the service server does not access or record the off-chain data if the record associated with the service request is not stored in the blockchain.

3. The data management system of claim 1, wherein the first request is a read request or a download request of the original data; and
the service server, upon receiving the first request, restores the original data using both the off-chain data stored in the storage node and data stored in the blockchain.

4. The data management system of claim 1, wherein the blockchain node and the service server are computing devices connected to an internal network of a first organization; and
the blockchain is a private blockchain of the first organization;
the storage node is a device configuring a dedicated storage system of the first organization; and
the service server is a device serving as both a service server of the block chain and a service server of the dedicated storage system.

5. The data management system of claim 1, wherein the blockchain node and the service server are computing devices connected to an internal network of a first organization;
the blockchain, within a blockchain network constituted along with a blockchain node of at least one other organization besides the first organization, is operated to match a channel constituted with a blockchain node of the first organization, and is not allowed to be accessed by a blockchain node of other organization besides the first organization;
the storage node is a device configuring a dedicated storage system of the first organization; and
the service server is a device serving as both a service server of the block chain and a service server of the dedicated storage system.

6. The data management system of claim 1, wherein the service server performs a plurality of times of sending the transaction proposal to the blockchain node if the service request is a registration request of new data.

7. The data management system of claim 6, wherein the service server receives reference data associated with the new data from the client, generates transaction contents using the reference data, and sends a transaction proposal including the transaction contents; and a data size of the reference data necessary to generate transaction contents included in a previous transaction proposal is less than a data size of the reference data necessary to generate transaction contents included in a next transaction proposal.

8. The data management system of claim 1, wherein the service server, when the service request is a registration request of new data or an update request of existing data, sends off-chain data to be recorded/updated in the storage node to the storage node only if it is possible to determine an agreement success by using a response to the transaction proposal.

9. The data management system of claim 8, wherein the service server generates the off-chain data using the new data received from the client or updated existing data, and sends the generated off-chain data to the storage node.

10. The data management system of claim 1, wherein the service server automatically deletes the new off-chain data recorded in the storage node according to the service request if it is impossible to determine an agreement success by using a response to the transaction proposal received from the blockchain node.

11. The data management system of claim 1, wherein the service server, when the service request is a registration request of new data or an update request of existing data, automatically determines a processing type of the service request as one of pre-agreement or pre-upload;
the service server, if the processing type of the service request is determined as pre-agreement, sends a transaction proposal to the blockchain node for a record associated with the service request to be stored in the blockchain and sends the off-chain data to the storage node only if it is possible to determine an agreement success by using a response to the transaction proposal; and
the service server, if the processing type of the service request is determined as pre-upload, records new off-chain data in the storage node according to the service request and sends a transaction proposal to the blockchain node for a record associated with the service request to be stored in the blockchain.

12. A data management system comprising:
a first blockchain node of a first institution configured to store a blockchain recording on-chain data;
a second blockchain node of a second institution configured to store the blockchain;
a first storage node dedicated to a first organization for storing off-chain data of the first institution for the blockchain; and
a second storage node dedicated to a second organization for storing off-chain data of the second institution for the blockchain; and
a first service server of the first institution configured to receive a service request associated with original data from a client of the first institution,
wherein the first service server comprises a processor, a memory for loading a computer program executed by the processors, and a storage for storing the computer program;
the computer program comprises instructions for implementing operations comprising i) accessing off-chain data stored in the first storage node or recording off-chain data in the first storage node according to the service request, and ii) sending a transaction proposal to at least some of the first blockchain node and the second blockchain node for a record associated with the service request to be stored in the blockchain;
a blockchain node of the first institution and a blockchain node of the second institution are connected by the same channel,
the first blockchain node queries the first storage node, and the second blockchain node queries the second storage node; and
the first service server, when the service request is a registration request of new data, sends a transaction proposal, in which registration of the new data is transaction contents, to the second blockchain node only if the second institution belongs to a sharing institution of the new data.

13. The data management system of claim 12, wherein the first storage node sends only some data of off-chain data stored in the first storage node, which is set to be shared with the second institution, to the second storage node.

14. The data management system of claim 13 further comprising:
a first service server of the first institution, upon receiving a service request associated with the original data from a client of the first institution, i) accessing off-chain data stored in the first storage node or recording off-chain data in the first storage node according to the service request, and ii) sending a transaction proposal to at least some of the first blockchain node and the second blockchain node for a record associated with the service request to be stored in the blockchain; and
a second service server of the second institution, upon receiving a service request associated with the original data from a client of the second institution, i) accessing off-chain data stored in the second storage node or recording off-chain data in the second storage node according to the service request, and ii) sending a transaction proposal to at least some of the first blockchain node and the second blockchain node for a record associated with the service request to be stored in the blockchain,
wherein the first storage node sends only some data of off-chain data stored in the first storage node, which is set to be shared with the second institution, to the second storage node via the first service server and the second service server.

15. The data management system of claim 13 further comprising:
a first-first storage node dedicated to the first institution located in a cloud storage system along with the first storage node for storing off-chain data of the first institution for the blockchain; and
a second-first storage node dedicated to the second institution located in a cloud storage system along with the first storage node for storing off-chain data of the second institution for the blockchain,
wherein the first storage node sends only some data of off-chain data stored in the first storage node, which is set to be shared with the second institution, directly to the second storage node; and
the first-first storage node also sends only some data of off-chain data stored in the first-first storage node, which is set to be shared with the second institution, directly to the second-first storage node.

16. The data management system of claim 13, wherein if a type of the sharing is fork, forked original data is recorded in the blockchain as independent data of the second institution.

17. The data management system of claim 12 further comprising,
- a first service server of the first institution, upon receiving a service request associated with the original data from a client of the first institution, i) accessing off-chain data stored in the first storage node or recording off-chain data in the first storage node according to the service request, and ii) sending a transaction proposal to the first blockchain node and the second blockchain node for a record associated with the service request to be stored in the blockchain,
- wherein the first blockchain node and the second blockchain node execute the same smart contract, but the smart contract includes logic to return a consent response without a condition to every transaction proposal associated with data that is not shared with an institution, to which the blockchain node executing smart contract belongs.

18. The data management system of claim 12, wherein the first storage node, when at least some off-chain data of original data that is being shared after being shared from the second institution to the first institution according to a transaction of the blockchain are deleted, receives deleted off-chain data from the second storage node.

* * * * *